US009323983B2

(12) United States Patent
Monnerat et al.

(10) Patent No.: US 9,323,983 B2
(45) Date of Patent: Apr. 26, 2016

(54) REAL-TIME IMAGE AND AUDIO REPLACEMENT FOR VISUAL ACQUISITION DEVICES

(71) Applicant: Comcast Cable Communications, LLC, Philadelphia, PA (US)

(72) Inventors: Edward David Monnerat, Highland Ranch, CO (US); David B. Leach, Centennial, CO (US); Jonathan Alan Leech, Denver, CO (US); Mehul S. Patel, Centennial, CO (US); Nicholas Adam Pinckernell, Littleton, CO (US); Nicholas Cotner, Littleton, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 7 days.

(21) Appl. No.: 14/290,250

(22) Filed: May 29, 2014

(65) Prior Publication Data

US 2015/0347823 A1    Dec. 3, 2015

(51) Int. Cl.
| G06K 9/00 | (2006.01) |
| G06T 1/00 | (2006.01) |
| G06K 9/64 | (2006.01) |
| G06F 17/30 | (2006.01) |
| G02B 27/01 | (2006.01) |
| G06T 19/00 | (2011.01) |
| G06F 3/16 | (2006.01) |
| G11B 27/022 | (2006.01) |

(52) U.S. Cl.
CPC .......... *G06K 9/00288* (2013.01); *G02B 27/017* (2013.01); *G06F 3/165* (2013.01); *G06F 17/30247* (2013.01); *G06K 9/64* (2013.01); *G06T 1/00* (2013.01); *G06T 19/006* (2013.01); *G11B 27/022* (2013.01); *G02B 2027/0178* (2013.01)

(58) Field of Classification Search
CPC ................... G02B 2027/0178; G02B 27/017; G06F 17/30247; G06K 9/00288; G06T 19/006; G06T 1/00; G11B 27/022
USPC ......................................................... 382/118
See application file for complete search history.

(56) References Cited

U.S. PATENT DOCUMENTS

| 7,631,968 | B1 | 12/2009 | Dobson et al. | |
| 7,648,236 | B1 | 1/2010 | Dobson | |
| 7,675,683 | B2 | 3/2010 | Dobson et al. | |
| 8,510,166 | B2 | 8/2013 | Neven | |
| 2008/0268876 | A1* | 10/2008 | Gelfand | G06Q 30/02 455/457 |
| 2012/0290401 | A1 | 11/2012 | Neven | |
| 2013/0007672 | A1 | 1/2013 | Taubman | |
| 2013/0016070 | A1 | 1/2013 | Starner et al. | |
| 2013/0016292 | A1 | 1/2013 | Miao et al. | |
| 2013/0016413 | A1 | 1/2013 | Saeedi et al. | |
| 2013/0017789 | A1* | 1/2013 | Chi | G02B 27/01 455/41.2 |
| 2013/0018659 | A1 | 1/2013 | Chi | |
| 2013/0021374 | A1* | 1/2013 | Miao | G06F 3/011 345/633 |
| 2013/0021658 | A1 | 1/2013 | Miao et al. | |
| 2013/0022220 | A1 | 1/2013 | Dong et al. | |
| 2013/0044042 | A1 | 2/2013 | Olsson et al. | |

OTHER PUBLICATIONS

Slawski, Bill, "Google Glass, Mobile and Mobile Search Marketing: Google Glass Hardware Patents, Part 1," Jan. 17, 2013, downloaded from http://seobythesea.com/2013/01/google-hardware-patents, 26 pages.

* cited by examiner

*Primary Examiner* — Manuchehr Rahmjoo
(74) *Attorney, Agent, or Firm* — Banner & Witcoff, Ltd.

(57) ABSTRACT

According to some aspects, disclosed systems and methods include obtaining an image displaying an object; and performing pattern recognition on the image to determine a characteristic of the object. The systems and methods also include searching a central repository based on the characteristic to determine a candidate match associated with the object, the candidate match being associated with a preference, the preference comprising display instructions for the image; and modifying the image based on the display instructions for the image.

19 Claims, 19 Drawing Sheets

REAL-TIME IMAGE AND AUDIO REPLACEMENT FOR VISUAL ACQUISITION DEVICES

BACKGROUND

More and more attention is being paid to mobile imaging and audio devices being worn like eyeglasses by users. The ability to take images at any instant and record audio at any time will provide the public unrestricted means to intrude in the lifestyles of individuals. This creates a host of privacy concerns. For example, a person could walk around and collect images and audio of other people without their knowledge. Thus, there is an ever-present need to protect personal privacy, while maximizing the potential use of mobile imaging devices.

SUMMARY

The following presents a simplified summary of the disclosure in order to provide a basic understanding of some aspects. It is not intended to identify key or critical elements of the disclosure or to delineate the scope thereof. The following summary merely presents some concepts of the disclosure in a simplified form as a prelude to the more detailed description provided below.

One or more aspects of the disclosure provide a method that may include obtaining an image displaying an object; and performing pattern recognition on the image to determine a characteristic of the object. The method may also include searching a central repository based on the characteristic to determine a candidate match associated with the object, the candidate match being associated with a preference, the preference comprising display instructions for the image; and modifying the image based on the display instructions for the image.

One or more aspects of the disclosure provide a method that may include obtaining an audio clip associated with an object; and performing pattern recognition on the audio clip to determine a characteristic of the audio clip. The method may also include searching a central repository based on the characteristic to determine a candidate match associated with the audio clip, the candidate match being associated with a preference, the preference comprising audio instructions for the audio clip; and modifying the audio clip based on the audio instructions for the audio clip.

One or more aspects of the disclosure provide a method that may include obtaining an image displaying at least one object; and performing pattern recognition on the image to determine at least one characteristic of the at least one object. The method may also include searching a database based on the at least one characteristic to determine at least one entry associated with the at least one object, the at least one entry being associated with at least one preference, the at least one preference comprising display instructions for the image; and modifying the image based on the display instructions for the image.

The details of these and other embodiments of the present disclosure are set forth in the accompanying drawings and the description below. Other features and advantages of the disclosure will be apparent from the description and drawings, and from the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
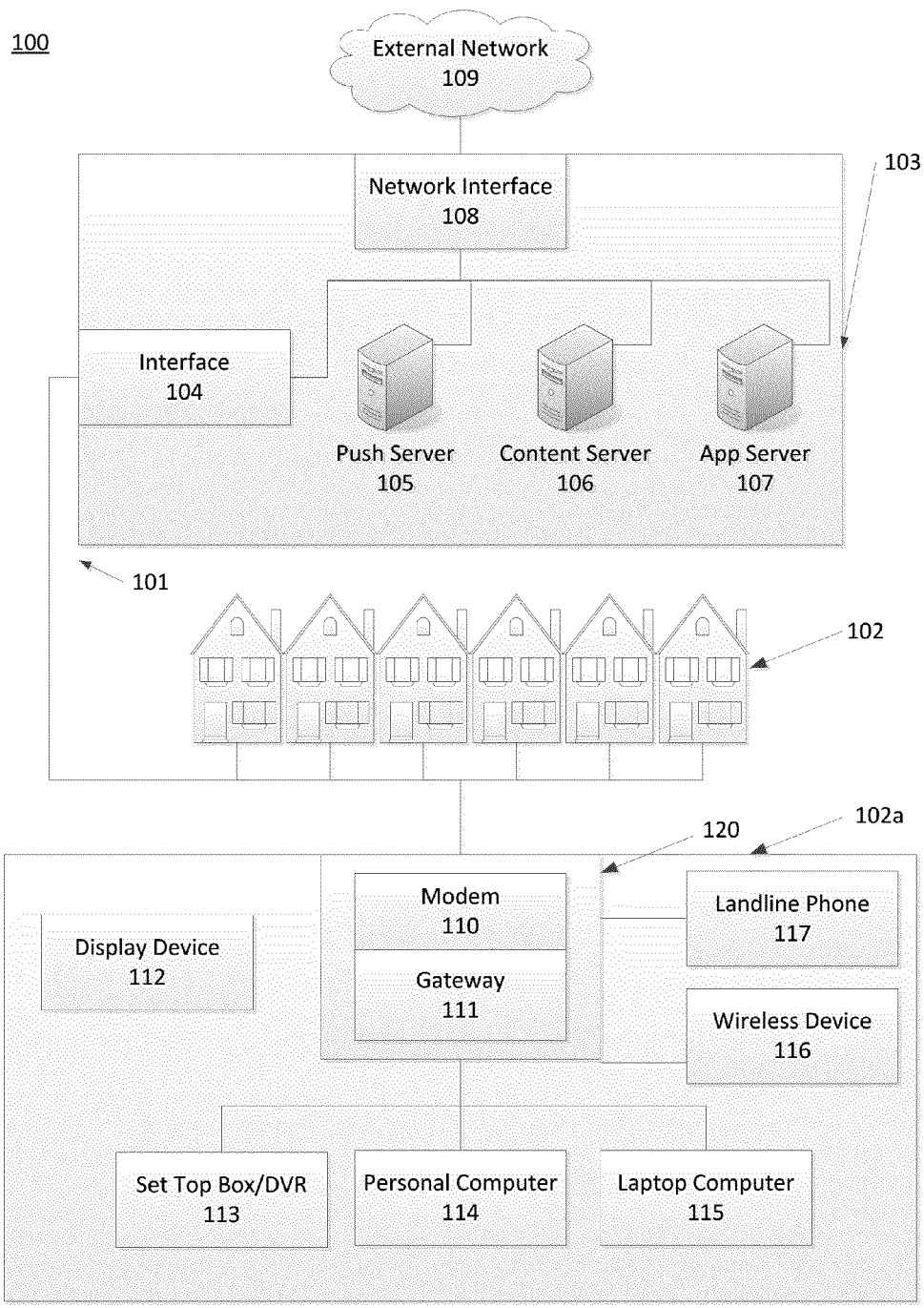
FIG. 1 illustrates an example communication network on which various features described herein may be used.

FIG. 1 illustrates an example communication network 100 on which many of the various features described herein may be implemented. The network 100 may be any type of information distribution network, such as satellite, telephone, cellular, wireless, etc. One example may be an optical fiber network, a coaxial cable network, and/or a hybrid fiber/coax distribution network. The network 100 also may include multiple types of networks (e.g., Wi-Fi 802.11a-n, Ethernet, 3G, 4G, and 4GLTE) that interconnect. Such networks 100 use a series of interconnected communication links 101 (e.g., coaxial cables, optical fibers, wireless, etc.) to connect multiple premises 102 (e.g., businesses, homes, consumer dwellings, etc.) to a local office or head end 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of the links 101 than before.

The local office 103 may include an interface 104, such as a termination system (TS). More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server 107 may be responsible for formatting and inserting advertisements in a video stream being transmitted to the premises 102. Still another application server 107 may be responsible for tracking and collecting billing data associated with various premises 102 equipment. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box, digital video recorder (DVR), computer server, or any other desired computing device. The gateway 111 may also include (not shown) local network interfaces to provide communication signals to requesting entities/devices in the premises 102a, such as display devices 112 (e.g., televisions), additional set-top boxes or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
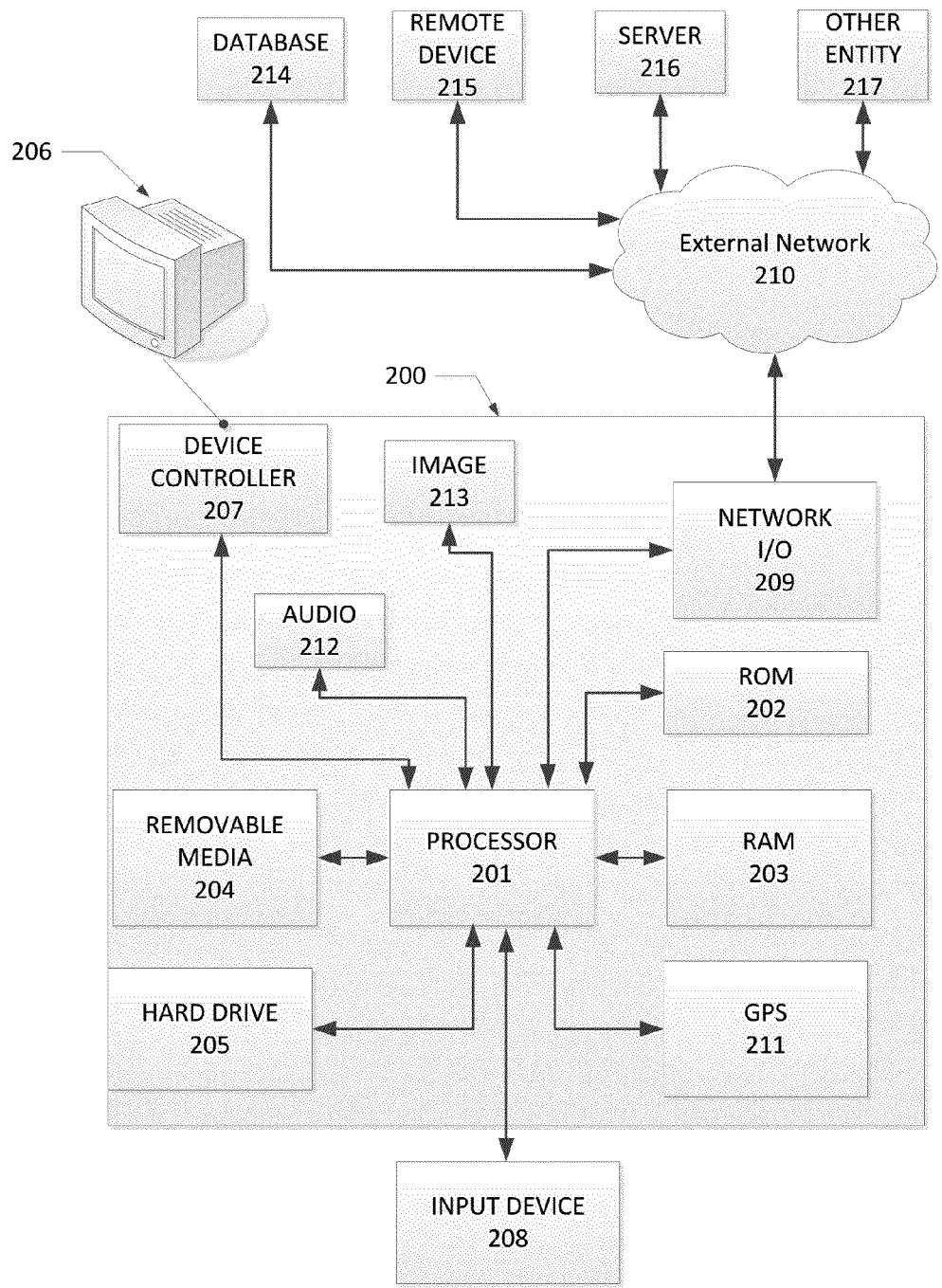
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. The external network 210 may also include wireless connection(s), which may be, for example, BLUETOOTH radio technology, communication protocols described in IEEE 802.11, cellular/mobile device technology/protocols, and/or communication protocols described in IEEE 802.15.4, and the like. Additionally, the computing device 200 may include a location-detecting device, such as a global positioning system (GPS) microprocessor 211, which can be configured to receive and process global positioning signals and determine, with possible assistance from an external server and antenna, a geographic position of the device. The computing device 200 may include an audio component 212, such as a speaker and/or microphone, and may also include an imaging component 213, such as a digital camera and/or video camera and the like. The external network 210 may also connect (e.g., via a wireless or wired connection) the computing device 200 to other devices and/or entities, such as a database 214, a remote device 215, which may be any type of computing device or transmitting device such as a mobile phone or radio-frequency identification device, a server 216, and/or any other entity 217. Alternatively, the computing device 200 may interact with other devices directly without the use of a network.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., the processor 201, the ROM storage 202, the display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
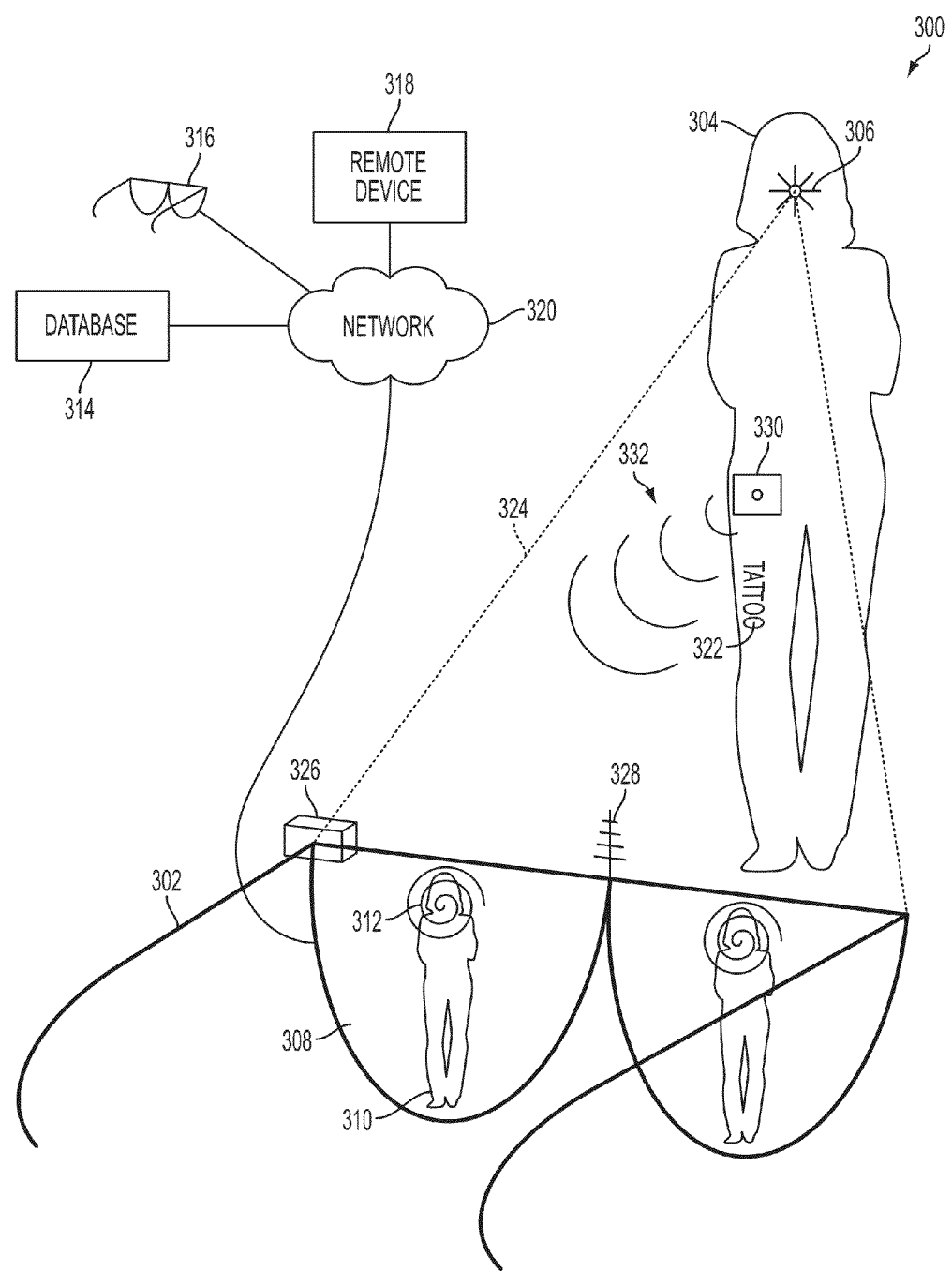
FIG. 3 illustrates an example head-mounted display, in accordance with one or more disclosed features described herein.

FIG. 3 illustrates an example system 300 in accordance with aspects of the present disclosure. The system 300 may include a head-mounted display 302, which may be, a computing device such as the computing device 200. The head-mounted display 302 may be, for example, a visual acquisition device, and may be worn by a user on, for example, a user's head like eyeglasses. Although referred to herein as a head-mounted display, the device may be any wearable or other device capable of image/audio capture and/or display. The head-mounted display 302 may be an augmented reality device and/or a recording device, which may be used to collect data about an object, such as by capturing an image or audio of the object. The head-mounted display 302 may include the display 308, which may display an image 310 of an object 304, such as person, basketball, or any other object. The object 304 may include one or more marks 322, which may be, for example, tattoos, emblems, blemishes, and the like. The image 310 may be captured by a camera 326, which may be attached and/or included in the head-mounted display 302. The head-mounted display 302 may also include a transceiver 328, which may be used to communicate with various transmitters, such as a transmitter 330, which may be for example, a radio-frequency identification device or barcode. The transmitter 330 may associated with and/or attached to the object 304. In some embodiments, the transmitter 330 may be a light emitter which may transmit/broadcast information at a particular frequency and/or in a particular sequence, such as Morse code. The transmitter 330 may be configured to transmit a signal 332, such as a broadcast signal, which may be received by a transceiver 328. The signal 332 may be an encoded stream of data that may include broadcast information, such as preferences associated with the transmitter, which will be discussed in more detail below. The transmitter 330 may also be captured in an image and/or be recognized by the camera 326. the head-mounted display 302 may be connected, directly and/or through a network 320, to a database 314 (which may be part of a server, e.g.), another head-mounted display 316, and/or a remote device 318. The network 320 may be, for example, a network as described above, such as the network 100 or the external network(s) 109 or 210.

The image 310 may be captured by the camera 326, which may be attached and/or included in the head-mounted display 302. The camera 326 may be any type of still-image or video camera, and thus, the image 310 may be a still-image or motion image, such as a video. The camera 326 may include a field of view 324, which may include objects, such as the object 304, and in which the image 310 may reflect on the display 308. The display 308 may cover all or a portion of, for example, a user's eyes. Accordingly, the display 308 may be shaped in any number of ways, such as covering a portion of a user's face and/or covering a portion of an eye. In some embodiments, a user may look through the display 308 to view the image 310. In some embodiments, the display 308 may include an overlaid portion to display the image 310. The field of view 324 may have a focus point 306, which may be used to focus on a portion of an object, such as a face of a person or an area of a basketball court. The head-mounted display 302 may include an actuation mechanism, such as voice control and/or physical actuation, which may be used to operate the head-mounted display 302. For example, the camera 326 may capture the image 310 by a voice command issued by a user or by a user physically contacting, for example, a portion of the head-mounted display 302. Additionally, the image 310 may include a modified portion (e.g., distorted or scrambled), as shown by the modification 312, which may result from instructions from one or more preferences associated with an object, such as the object 304, and/or associated with a transmitter, such as the transmitter 330. The transmitter 330 may transmit a signal 332, which may be recognized by the head-mounted display 302, such as by the transceiver 328 and/or the camera 326. This will be described in more detail below.

Figure 4:
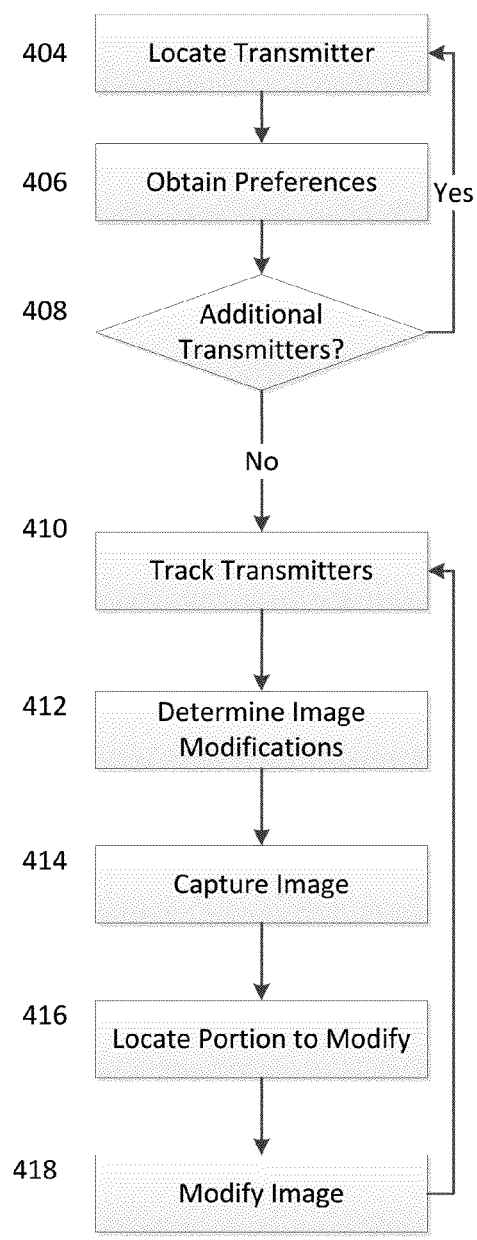
FIG. 4 is a flow diagram illustrating an example process of an interaction between a head-mounted display and a transmitter, in accordance with one or more disclosed features described herein

FIG. 4 is a flow diagram of an example process 400 describing an interaction between an imaging device, such as a head-mounted display, and a transmitter in accordance with aspects of the present disclosure. Process 400 may include situations where a head-mounted display, such as the head-mounted display 302, may be capturing images with the camera 326, and the transmitter 330 may be transmitting a signal for reception by the head-mounted display 302. In step 404, the head-mounted display 302 may locate a transmitter 330, such as by detecting a signal, such as the signal 332. In some embodiments, the head-mounted display 302 may detect the signal 332 (e.g., locate the transmitter 330) when the signal 332 has a signal strength satisfying a threshold value. The transmitter 330 may be associated with an object 304, which may be, for example, a person or product (e.g., a PEPSI bottle, hat, computer, and the like). The transmitter 330 may be attached to an object or may be placed adjacent to an object. In other embodiments, the transmitter 330 may be located at a remote location than an object for which the transmitter 330 may be associated. In some embodiments, the transmitter 330 may be a particular pattern, such as a barcode and/or QR code, which may be detected by the transceiver 328 or captured in an image 310. According to some aspects, the transmitter 330 may be a proprietary chip and/or may be Bluetooth, wireless, or any protocol capable of being transmitted and received, for example, wirelessly by the head-mounted display 302. The transmitter 330 may be an application running on a computing device, such as a mobile device.

In step 406, one or more preferences associated with the transmitter 330 may be obtained by, for example, the head-mounted display 302. Preferences may include instructions regarding how an head-mounted display may interact with an object, such as how to display an object associated with the preferences and/or transmitter. For example, the transmitter 330 may be configured to trigger the head-mounted display 302 to modify an image captured by the head-mounted display 302, such as the image 310, using one or more preferences associated with the transmitter. In some embodiments, the transmitter 330 may broadcast a signal (e.g., the signal 332), which may be received by the head-mounted display 302, using, for example the transceiver 328. The signal may be, for example, a beacon in the non-visible light spectrum that may interact with the head-mounted display 302. The signal may also be a visible light signal that may display a pattern, such as Morse code, and/or one or more colors or shapes. The signal may also include information, such as preferences associated with the transmitter. After the head-mounted display 302 receives the signal 332, the head-mounted display 302 may perform activities, such as modifying images, in accordance with the preferences associated with the transmitter. For example, a preference may include instructions to block or distort a portion of a person's body, such as a person who is associated with the transmitter. Thus, in one example, a person may desire privacy and may not want their face to be captured in images captured by the head-mounted display 302, such as in the image 310. Thus, using preferences, a person may "opt-out" of being included in an image. Alternatively, if a person is currently opting-out of an image or otherwise having their image being distorted by the head-mounted display 302, then a person's preferences may indicate that the person wants to "opt-in," and thus an image captured by the head-mounted display 302 may be modified from being distorted to substantially resembling the person (i.e., non-distorted). According to some aspects, the transmitter 330 may be a barcode which may trigger the head-mounted display 302 to modify a captured image. The head-mounted display 302 may recognize the barcode using, for example, pattern recognition, which may trigger the head-mounted display 302 to modify the image. In some embodiments, the preferences may include displaying information associated with an object, such as displaying a name, job title, e-mail address, and the like, adjacent to an associated object. Additionally, preferences may be stored at a remote location, such as in the database 314, another head-mounted display 316, or a remote device 318. In response to locating a transmitter, the head-mounted display 302 may connect with one of these devices, and retrieve any preferences associated with the transmitter. For example, the database 314 may store preferences associated with one or more transmitters, and may provide these preferences to requesting devices, such as the head-mounted display 302. Preferences will be described in more detail below.

In step 408, it is determined whether the head-mounted display 302 detects any additional transmitters, such as by detecting a strong enough signal transmitted from any transmitters. If it is determined at step 408 that the head-mounted display 302 does detect additional transmitters, then the process 400 returns to step 404. If it is determined at step 408 that the head-mounted display 302 does not detect additional transmitters, then the process 400 continues to step 410. In step 410, transmitters, such as the transmitter 330, may be tracked by the head-mounted display 302. Tracking may be accomplished by detecting the signal 332 using any of the above protocols, and/or by detecting whether the signal 332 drops below a threshold signal level.

In step 412, it is determined whether and which image modifications may take place. For example, preferences may be transmitted to the head-mounted display 302, but may not indicate an image modification. The head-mounted display 302 (or a user associated with the head-mounted display 302) may be, for example, on a list of approved devices (or users) associated with the transmitter 330, and thus may be able to capture a non-modified image of an object associated with the transmitter 330. Alternatively, the head-mounted display 302 may not be, for example, on a list of approved devices associated with the transmitter 330 or may be on a list of unapproved devices associated with the transmitter 330, and thus may be otherwise blocked from capturing a non-modified image of an object associated with the transmitter 330. Such lists may be included in the preferences and/or be separate from the preferences. In some embodiments, a user may specify in the preferences, such as preferences associated with a transmitter, how an image may appear, be modified, and the like for a particular head-mounted display. In some embodiments, a user may create a list of users and/or head-mounted displays (which may or may not be included in the preferences associated with the transmitter) that may allow for capturing an otherwise modified image. These preferences may also be used in additional embodiments disclosed herein.

In step 414, the head-mounted display 302 may capture an image of the object associated with the transmitter 330 using, for example the camera 326. The image may be stored in a remote database associated with the head-mounted display 302 or locally on the head-mounted display 302. During this step, the image may not be readily available for display by the head-mounted display 302, because further modification may need to be performed on the image.

In step 416, a portion of the image in which a modification may be performed may be located. For example, referring to FIG. 3, an object 304, which may be a person, may not want his or her face shown in an image captured by the head-mounted display 302. Thus, a person may indicate in the preferences associated with a transmitter to distort his or her face in images captured by, for example the head-mounted display 302. The head-mounted display 302 may locate the part of the image 310 for which modification may be performed using, for example, pattern recognition. Accordingly, a characteristic of an object or a pattern, such as a face or portion of a face, in the image 310 may be detected and/or recognized (e.g., via facial recognition), and may be subsequently modified at step 418.

In step 418, the portion of the image 310 may be modified and displayed on, for example, the display 308. For example, a person's face may be distorted, as shown by the modification 312 in FIG. 3. In some embodiments, the modification may be a blur, or an enlargement, or a shrinkage. In some embodiments, the modification may include avatar replacement, in which a portion of an object may be replaced by an avatar. For example, a person may want to be shown in a captured the image 310 with a trademarked item. The person may then indicate this in preferences associated with the transmitter 330, and the person may be shown in the image 310 with the trademarked item. This will be described in greater detail further below. After step 418, the process may return to step 410 to track transmitters, and thus may reapply preferences associated with the tracked transmitters in, for example, real-time.

Figure 5:
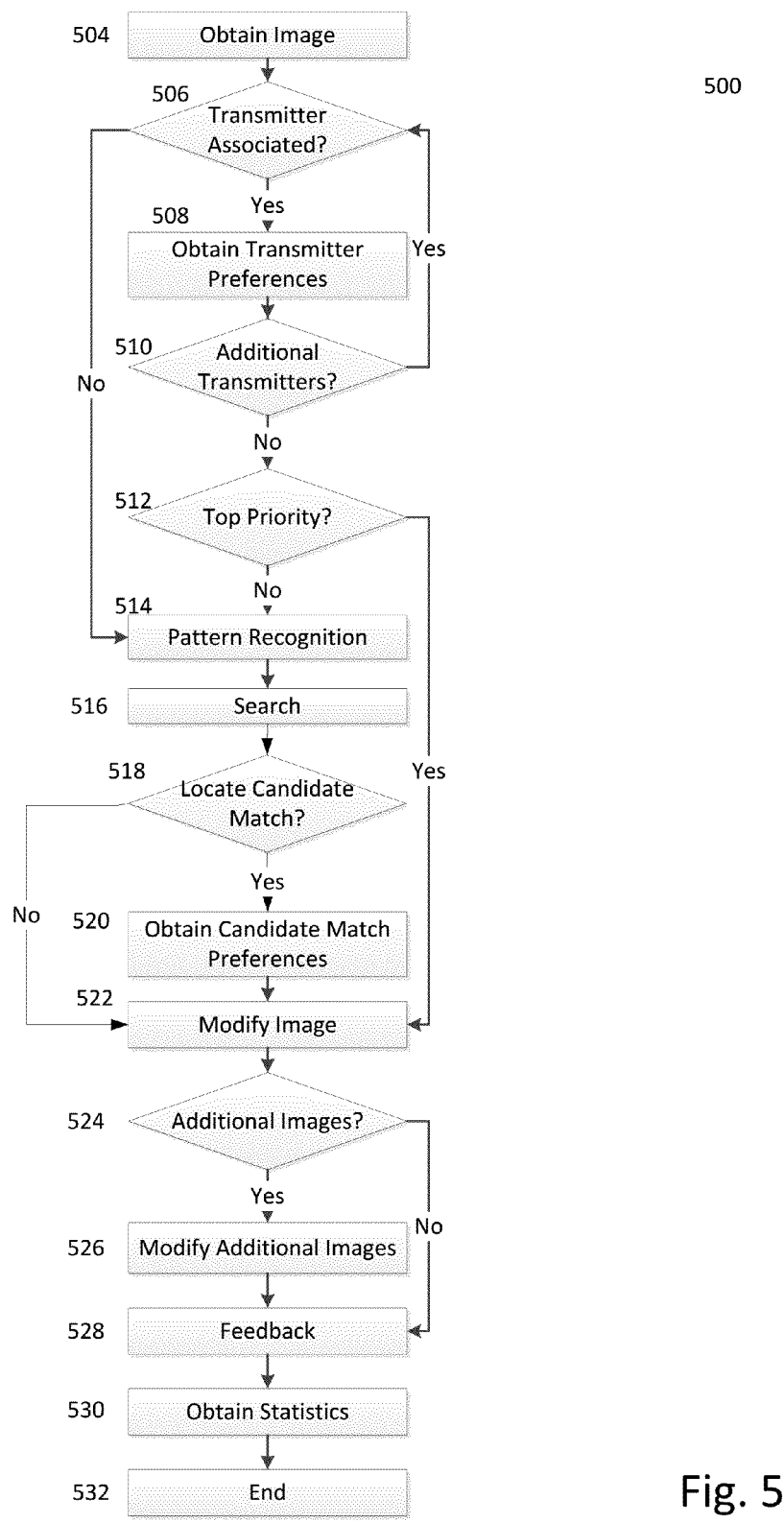
FIG. 5 is a flow diagram illustrating an example process of capturing an image with a head-mounted display using pattern recognition and a transmitter, in accordance with one or more disclosed features described herein.

FIG. 5 is a flow diagram of an example process 500 describing capturing an image with an imaging device, such as a head-mounted display, which may use pattern recognition and a transmitter in accordance with aspects of the present disclosure. Process 500 may begin at step 504, in which an image 310 may be obtained by a head-mounted display, such as the head-mounted display 302, using, for example, the camera 326. In some embodiments, the image 310 may be captured with a remote device, such as a camera remote to the head-mounted display 302, and subsequently transmitted to the head-mounted display 302.

In step 506, it is determined whether a transmitter, such as the transmitter 330, may be associated with the obtained the image 310. As stated above with respect to FIG. 4, the head-mounted display 302 may locate a transmitter 330, such as by detecting a signal, such as the signal 332. In some embodiments, the head-mounted display 302 may determine that a transmitter may be associated with an image by correlating the time the signal 332 that was detected with a time the image was obtained. In some embodiments, the correlation may result from an audio clip captured at substantially the same time as the image (which will be described in more detail below). In some embodiments, the head-mounted display 302 may require that a threshold value associated with the transmitter and/or signal may be needed to locate a transmitter and/or to detect a signal. The transmitter 330 may be associated with an object 304, which may be a person or product (e.g., a PEPSI bottle, hat, computer, and the like), and the object 304 may be captured in the image 310. The transmitter 330 may be attached to an object or may be placed adjacent to an object for which the transmitter 330 is associated. In other embodiments, the transmitter 330 may be located at a remote location than an object for which it is associated. In some embodiments, the transmitter 330 may be a particular pattern, such as a barcode and/or QR code, which may be detected by the transceiver 328 or captured in an image 310. According to some aspects, the transmitter 330 may be a proprietary chip, may be Bluetooth, wireless, or any protocol capable of being transmitted and received, for example, wirelessly by the head-mounted display 302. The transmitter 330 may be an application running on a computing device, such as a mobile device. If it is determined at step 506 that a transmitter may not be associated with the obtained the image 310, then the process continues to step 514, which will be addressed below. If it is determined at step 506 that a transmitter may be associated with the obtained the image 310, then the process continues to step 508.

In step 508, one or more preferences associated with the transmitter may be obtained by, for example, the head-mounted display 302. As stated above with respect to FIG. 4, preferences may include instructions regarding how a head-mounted display may interact with an object, such as how to display an object associated with the preferences and/or transmitter. For example, the transmitter 330 may be configured to trigger the head-mounted display 302 to modify an image captured by the head-mounted display 302, such as the image 310, using one or more preferences associated with the transmitter. In some embodiments, the transmitter 330 may broadcast a signal (e.g., the signal 332), which may be received by the head-mounted display 302, using, for example the transceiver 328. The signal may be, for example, a beacon in the non-visible light spectrum that may interact with the head-mounted display 302. The signal may also be a visible light signal that may display a pattern, such as Morse code, and/or one or more colors or shapes. The signal may also include information, such as preferences associated with the transmitter. Preferences may be stored at a remote location, such as in the database 314, another head-mounted display 316, or the remote device 318. In response to locating a transmitter, the head-mounted display 302 may connect with one of these devices, and retrieve the preferences associated with the transmitter. For example, database 314 may store preferences associated with one or more transmitters, and may provide these preferences to requesting devices, such as the head-mounted display 302. A user may modify preferences associated with a transmitter. For examples, if the transmitter comprises an application running on a computing device (e.g., a mobile device), the user may configure the preferences using the application. If, for example, the transmitter comprises a barcode or an application running on a computing device, associated preferences may be stored in, for example, a database, such as the database 314, which may be associated with some other entity, such as a company. The user may then access the database 314 to modify any preferences. In some embodiments, preferences may be stored on a remote device, such as the head-mounted display 316 or a mobile device, which may be worn by a user associated with the transmitter 330. Thus, the head-mounted display 302 may connect to the database 314 and/or the remote device directly and/or through a network, such as the network 320.

In step 510, it is determined whether the head-mounted display 302 detects any additional transmitters, such as by detecting a strong enough signal transmitted from any transmitters. If it is determined at step 510 that the head-mounted display 302 does detect additional transmitters, then the process 500 returns to step 506. If it is determined at step 510 that the head-mounted display 302 does not detect additional transmitters, then the process 500 continues to step 512.

In step 512, it is determined whether preferences associated with the transmitter have top priority. Priority of preferences associated with the transmitter may be in relation to preferences associated with, for example, a pattern recognition search of a database (which will be described further below). For example, a user may set the preferences of his transmitter to take precedence over all other preferences associated with the user. Thus, preferences from other sources, such as from the pattern recognition search for a database, from other transmitters that may influence the imaging of the user (will be described further below), from other devices, and the like may be overridden by the preferences associated with a transmitter associated with a particular user. Accordingly, if it is determined at step 512 that preferences associated with the transmitter have top priority, then the process continues to step 522 (which will be described below). One skilled in the art will recognize that priority may be applied to any of the sources of preferences (e.g., preferences obtained from a pattern recognition search for a database, from other transmitters that may influence the imaging of the user, from other devices) and to any of the individual preferences associated with each source. Thus, if one source with a higher priority than a second source provides a preference for modifying a face of a user, then the first source may override any other preference directed to a substantially similar thing/preference by the second source. Also, if a source provides conflicting preferences, then a conflicting preference having higher priority may override and take precedence over a conflicting preference with a lower priority. If it is determined at step 512 that preferences associated with the transmitter may not have top priority, then the process continues to step 514.

In step 514, pattern recognition may be performed on the image. Thus, the head-mounted display 302 may include pattern recognition protocols to determine patterns in the image. For example, if the image 310 is of a person, then the head-mounted display 302 may use pattern recognition protocols, such as facial recognition protocols, to find and analyze one or more characteristics of the person's face. The facial recognition software may use characteristics such the shape and size of eyes, nose, ears, mouth, lips, cheekbones, jaw, and the like. The characteristics may also include distinguishing features, such as scars, blemishes, tattoos, and the like. Any known facial recognition system, method, algorithm, and/or protocol may be used in accordance with the disclosed features herein. Additionally, other pattern recognition protocols may be used to analyze other objects. For example, the head-mounted display 302 may use pattern recognition to analyze a shape of an object, patterns on the object, and items within the object. For example, the head-mounted display 302 may analyze an image of a bottle to detect characteristics of the bottle. For example, the head-mounted display 302 may detect a shape of a bottle, may detect that the bottle may have a blue and red color scheme, may detect that there may fluid inside of the bottle, and may detect the presence of any trademarks or trademarked images on the bottle, such as PEPSI or PEPSICO. Any known pattern recognition system, method, algorithm, and/or protocol may be used in accordance with the disclosed features herein. Additionally, other parts of a body and/or object associated with a body may be analyzed. For example, characteristics of legs, arms, height, hair color, clothing, eyewear, and the like may be analyzed by pattern recognition. For example, if a person has a tattoo on their leg, then this may be analyzed in step 514. Additionally, besides from inanimate objects and humans, animals may be analyzed. Anything that can be imaged by the head-mounted display 302 may be analyzed by the pattern recognition in step 514.

In step 516, the head-mounted display 302 may search a database (e.g., the database 314) based on, for example, an object's characteristics, for one or more potential or candidate matches to any of the objects analyzed in step 514, such as the object 304. A candidate match may be an entry in, for example, a database or centralized repository which may correlate to an actual object, such as the object 304. For example, an entry in the database may be created for a person, which may illustrate or describe characteristics of the person. People may register their faces and/or other body parties in the database, which may be similar to a "do not call" database commonly used with people's cell phone numbers. Alternatively, the database may be similar to a "do call" database. When a person registers an entry with the database, the person may associate preferences with the entry, such as distorting a portion of the person's body in an image, showing an object with the person in an image, replacing the person's body with an avatar in an image, and the like. Other objects may also be registered in such a database and have preferences associated with them, which will be described in herein. Objects that may have associated preferences stored in a database may be less prioritized than preferences associated with a transmitter. For example, a user may want to generally follow preferences entered in to the database, but may dynamically modify and/or adjust preferences associated with the user with the use of a transmitter, such as the transmitter 330. Thus, a priority may be associated with preferences associated with different sources (e.g., sources such as a database or transmitter). Priority will be discussed in greater detail below. In some embodiments, images collected from the internet may be used to help identify candidate matches. Such images may be collected in a database, and may be collected by a bot, which may crawl across different web sites cataloging images, video, audio, text, and the like. Images such as this may be used when trying to recognize a person imaged with a head-mounted display. Thus, there may be many entries, and depending on the level of specificity and/or accuracy, one or more candidate matches may result for the captured object 304. However, one or more of these candidate matches may be an entry that may actually correspond to the imaged object (e.g., may be the entry for which the person entered into the database for themselves). In some embodiments, a location associated with an imaged object may be used in the search to find candidate matches. For example, if an image of a person is captured in California, then the search may initially search entries in the database associated with California. Alternatively, if, for example, pattern recognition (or some other protocol or method, such as manual entry by a user) detects from the photo that the setting of the photo may be associated with California (e.g., in California), then the search may initially search entries in the database associated with California. This can apply to other objects besides humans. In the facial recognition example, one or more characteristics such as the shape of a person's mouth, a scar, and/or skin color, may be used to search for one or more candidate matches for the person's face. Additionally, a trademark or trademarked object (e.g., a PEPSI bottle) may be searched for using characteristics of the objects analyzed in step 514. In some embodiments, the image 310 may only capture a portion of an object, and thus, the search may be based on the captured portion of the object. For example, because a bottle may be round, only a portion of a trademark on the bottle may be displayed in the image 310. Thus, a search may be based on this portion of the trademark (e.g., a portion of a trademark associated with PEPSI or PEPSICO). Additionally, copyrighted works of art, such as movies, television shows, text, and the like may be searched. In some embodiments, more than one database may be search. In some embodiments, the database may be remote to the head-mounted display 302 or may be local to the head-mounted display 302.

In step 518, it is determined whether there may be any candidate matches found, for example, in the database for the captured object 304. For example, one or more mouths of entries in the database may substantially or at least partially match the analyzed mouth of the captured person. Accordingly, these matched mouths (and their corresponding faces/body, e.g.,) may result in candidate matches for the person. In some embodiments, a percentage-match may be determined, such that the closer the match, the higher the percentage-match. In some embodiments, matches may be ranked according to similarity with the analyzed image (such as based on the percentage-match). Additionally, candidate matches may be determined for a particular characteristic (such as for a mouth) or for more than one characteristic (such as for mouth and eyes). In some embodiments, a threshold, which may be based on a percentage-match, may need to be reached before a match becomes a candidate match. In some embodiments, a limit may be placed on the number of candidate matches. These settings may be implemented in the preferences associated with a candidate match and/or the preferences/settings of the head-mounted display 302 (which may be controlled by some entity, such as the local office 103, entity 217, remote device 318, and the like). If it is determined at step 518 that there may not be any candidate matches found, then the process continues to step 522 (which will be addressed below). If it is determined at step 518 that there may be candidate matches found, then the process continues to step 520.

In step 520, the head-mounted display 302 may access one or more preferences that may be associated with a candidate match. These preferences may be stored in a database, such the database 314. These preferences may be stored remote or local to the head-mounted display 302, such as in the remote device 215. For example, if a facial candidate match has an associated preference of blurring the face of the person, then the analyzed face in the image 310 may be blurred. In some embodiments, there may be conflicting preferences. For example, if a first candidate match has an associated preference of blurring the face, and a second candidate match has an associated preference of not blurring the face, then there may be a conflict because the head-mounted display 302 may not be able to both blur and not blur the face at the same time. Thus, in some embodiments, a priority may be determined with respect to candidate matches. Priority may be set amongst preferences such that a preference associated with a candidate match having a higher percentage-match may have a higher priority than a preference associated with a candidate match having a lower percentage-match. Other priority may be set. For example, characteristics may be prioritized and/or ranked, such as when a first candidate match has a high percentage-match for eyes, but a lower percentage-match for a mouth, and a second candidate match has a low percentage-match for eyes, but a high percentage-match for a mouth. In such an example, if the eyes characteristic has a higher priority than the mouth characteristic, then preferences associated with the first candidate match may be accessed. Alternatively, if the mouth characteristic has a higher priority than the eyes characteristic, then preferences associated with the second candidate match may be accessed. Additionally, preferences may be associated with other objects as well. For example, in the PEPSI bottle example, after determining that a candidate match may be a PEPSI bottle, a candidate match (e.g., PEPSI bottle and/or the trademark of "PEPSI") may have associated preferences. For example, after imaging a PEPSI bottle, a preference may be to blur the trademark from the image, such that "PEPSI" may be blurred. Alternatively, in another embodiment, a preference may indicate that "PEPSI" may not be blurred, and should be shown in any captured images. Additionally, preferences may indicate the addition, subtraction, and/or alteration of objects in the image 310. For example, a preference may be to change the color of a person's hair, show a person taller than they actually are, change the color of a person's shirt, show additional information in the image (such as name, telephone number, email address, and the like), change the appearance of a trademarked object, change the appearance of an object, change the appearance of a trademark, insert avatars into the image, and the like. Preferences will be addressed in more detail below.

In step 522, the image 310 may be modified based on any preferences associated with the image, such as from preferences associated with objects captured in the image. For example, a person's face may be blurred based on one or more preferences associated with a candidate match. In another example, a person's face may go from being blurred (e.g., if this is set as a default setting) to not blurred (e.g., to substantially resemble the person's face) based on one or more preferences associated with a candidate match. Additionally, preferences may be set for a head-mounted display 302, such that the head-mounted display 302 may perform image modifications based on its own preferences. For example, the head-mounted display 302 may include preferences that may instruct the head-mounted display 302 to blur all faces, or change everyone's hair, or blur particular buildings (e.g., using a GPS 211), and the like. These types of preferences/settings may be default preferences/settings. Additionally, at step 522, the preferences used in the modification of the captured image may come from various sources, such as preferences associated with a transmitter (e.g., from step 508), preferences associated with candidate matches, or preferences associated with a head-mounted display, such as the head-mounted display 302. Thus, a priority may be set amongst the sources of preferences. Thus, if a source has a higher priority than another source, such as a transmitter having a higher priority than both the candidate match and head-mounted display preferences, then preferences associated with the transmitter may be implemented before these other two sources.

In some embodiments, the priority may be implemented in the preferences themselves. For example, the transmitter preferences may indicate that preferences associated with the transmitter may have a highest priority (e.g., step 512). In some embodiments, the image modification may be based on preferences associated with a transmitter. In such embodiments, the head-mounted display 302 may detect characteristics of the object 304, such that just enough detail may be captured and/or analyzed to determine where a modification may take place on the object 304. For example, the head-mounted display 302 may detect a general area or general characteristics of a person's face if the preferences used are associated with the transmitter and indicate a modification of a face. In some embodiments, a preference may instruct the head-mounted display 302 to remove an object from the image and/or make the object invisible in the image.

In some embodiments, preferences may indicate users and/or head-mounted displays that may or may not be allowed to record a modified image. For example, the preferences (e.g., associated with the object 304) may include a list of approved devices and/or users. Devices on this list may follow preferences (e.g., associated with the object 304) different than devices not on the list of approved devices. For example, preferences associated with the object 304 may instruct head-mounted displays on an approved device list to distort a bottom portion but not a top portion of the object 304, and the preferences associated with the object 304 may instruct head-mounted displays not on the approved device list to distort a top portion but not a bottom portion of the object 304. In some embodiments, devices on the approved device list may be allowed to capture an unmodified image of the object 304, while devices not on an approved device list (or on an unapproved device list) may not be allowed to capture an unmodified image of the object 304. In some embodiments, the list may be updated/modified in real-time, such that a person may approve a device immediately. For example, a request to add the device to a person's list of approved devices may be sent to the person, and the person may send an approval or disapproval back to the device. For example, a request may be sent to a computing device associated with the person, such as a head-mounted display or computer associated with the person. The list may be separate from or associated with preferences. In another example, if business associates are in a meeting, a person wearing a head-mounted display may give approval to another head-mounted display located in the room by, for example, a voice command or physical actuation of the head-mounted display. In such embodiments, preferences may be associated with other individuals in the room such that images captured by head-mounted displays may display information associated with an imaged person, such as a name, telephone number, company, and the like. In some embodiments, a business may associate preferences with its employees, such that head-mounted displays, such as the head-mounted display 302, may capture images, which may be modified, according to preferences set by the company. For example, if PEPSI has an agreement with a company, and the company has a number of head-mounted displays associated with it, then a preference may be to always show a PEPSI advertisement in any images captured by any of the head-mounted displays associated with the company. Advertising will be discussed in more detail below.

In some embodiments, preferences may instruct head-mounted displays to alter the appearance of an object 304 if the image is captured in a particular location. For example, an object associated with (e.g., located inside of) or in proximity to a government building may have preferences associated with it such that the object may be modified and/or invisible when imaged. According to some aspects, head-mounted display may not even be able to capture an image in certain locations based on preferences associated with objects in those locations. For example, a government agency may not want any images taken by a head-mounted display within a certain proximity to any buildings or object associated with that agency. Alternatively, certain locations may allow unmodified images to be taken. For example, a person's home (and/or objects associated with the home) may have preferences associated with it or its proximity such that any head-mounted display that comes in proximity to the home or inside of the home may be allowed to take images, such as unmodified and/or modified images. Settings and preferences such as described in the above examples may or may not have priority over other preferences. In such examples, a device (such as a transmitter described above) may trigger these buildings and/or locations (and/or preferences associated with them) to deny, modify, not modify, and/or allow images captured by a head-mounted display. Alternatively or additionally, preferences may be associated with a GPS location, such that a modification of any images captured/obtained in or from that location may be modified according to those preferences associated with the location. For example, the NFL may not want people attending a sporting event to record games, or only allow people who have paid for a service or subscription to be allowed to record games with head-mounted displays. Thus, for example, the NFL may configure preferences associated with a live football game, such as with the stadium, such that certain head-mounted displays (e.g., those with a subscription) may be allowed to record images, such as unmodified images, and certain head-mounted displays (e.g., those without a subscription) may not be allowed to record images or may be allowed to record distorted images.

In some embodiments, preferences associated with a GPS location may be used to modify images with advertisements, such as displaying trademarks and/or products in images obtained of that location. For example, a captured image may show a PEPSI in the hand of a football player on a field. Such preferences may be dynamically changed and/or modified, such as by an entity associated with the advertised product. According to some aspects, a GPS device, such as the GPS 211, may be used to implement embodiments disclosed herein, such as the above black out zone examples. In some embodiments, certain objects, regardless of any other preferences, may appear modified or unmodified in images captured by head-mounted displays. For example, people in the military or police and/or objects associated with the military or police (such as military uniforms or tanks) may appear distorted and/or invisible in images captured by head-mounted displays. The head-mounted display 302 may use, for example, pattern recognition and/or a transmitter associated with such people or objects (such as the uniforms), and then modify the image accordingly. Additionally, preferences for such objects may be pre-set in head-mounted displays. In some embodiments, images may be associated with digital rights management, such that play back or displaying of an image, video, or audio may be performed by a particular set of head-mounted displays or for only a particular number of times, which may also relate to the list of approved devices.

In step 524, it is determined whether there may be additional images and/or objects associated with the preferences. For example, a head-mounted display may capture additional images of additional secondary objects (e.g., objects other than the object 304). Preferences associated with the analyzed primary object (e.g., the object 304) from the image 310 may indicate that these additional secondary objects, such as in the additional images, may be modified based on these preferences. These additional secondary objects may be part of the primary object's profile, and may be associated, for example, with a candidate match or a transmitter. For example, if preferences indicate that a person's son's face may be blurred, then any images captured by a head-mounted display, such as the head-mounted display 302, may include the blurred son's face. Thus, pattern recognition may be performed on these additional images to determine any secondary objects that may be included in an object's profile. In some embodiments, secondary objects in an object's profile may have their own associated preferences (e.g., preferences associated with a transmitter or candidate match). In such scenarios, a priority system may be used to determine which preferences may be used. Additionally, if a secondary object that may be included in a primary object's profile is displayed in the image 310, then the secondary object may also be modified based on the primary object's associated preferences. If it is determined at step 524 that additional images may not be associated with the primary object's preferences, then the process continues to step 528 (which will be discussed below). If it is determined at step 524 that additional images may be associated with the primary object's preferences, then the process continues to step 526.

In step 526, the additional images may be modified according to the primary objects preferences. As stated above, any other preferences associated with secondary objects may also be used in the image modification, and may be used according to an assigned priority.

In step 528, feedback regarding any modification (or non-modifications) may be provided. For example, feedback stating that a person's image (or images that include secondary objects) has been modified may be transmitted to a computing device (e.g., mobile device) associated with that person or other entity. Feedback may include how many devices are displaying an image associated with an object, how many of those images are modified or unmodified, and the like. In another example, feedback stating that a trademark has been modified may be transmitted to an entity associated with the trademark. Feedback may be provided about any of the aspects disclosed herein. Visible feedback may also be transmitted, such as a light, color, or flash. The feedback may come as an alert, such as in a text message or over social media. Feedback may also be transmitted to secondary objects that may also be modified in images.

In step 530, statistics may be obtained regarding any modification (or non-modifications). For example, modifications may be tracked and statistics may be obtained regarding a frequency of modification, what objects are being modified, which head-mounted displays may be performing modification, locations of where modifications may have taken place, and the like. Also, information regarding the candidate matches may be obtained, which may be used to further modify and refine the searching/matching protocols used in the pattern recognition. Process 500 may end at step 532.

Figure 6:
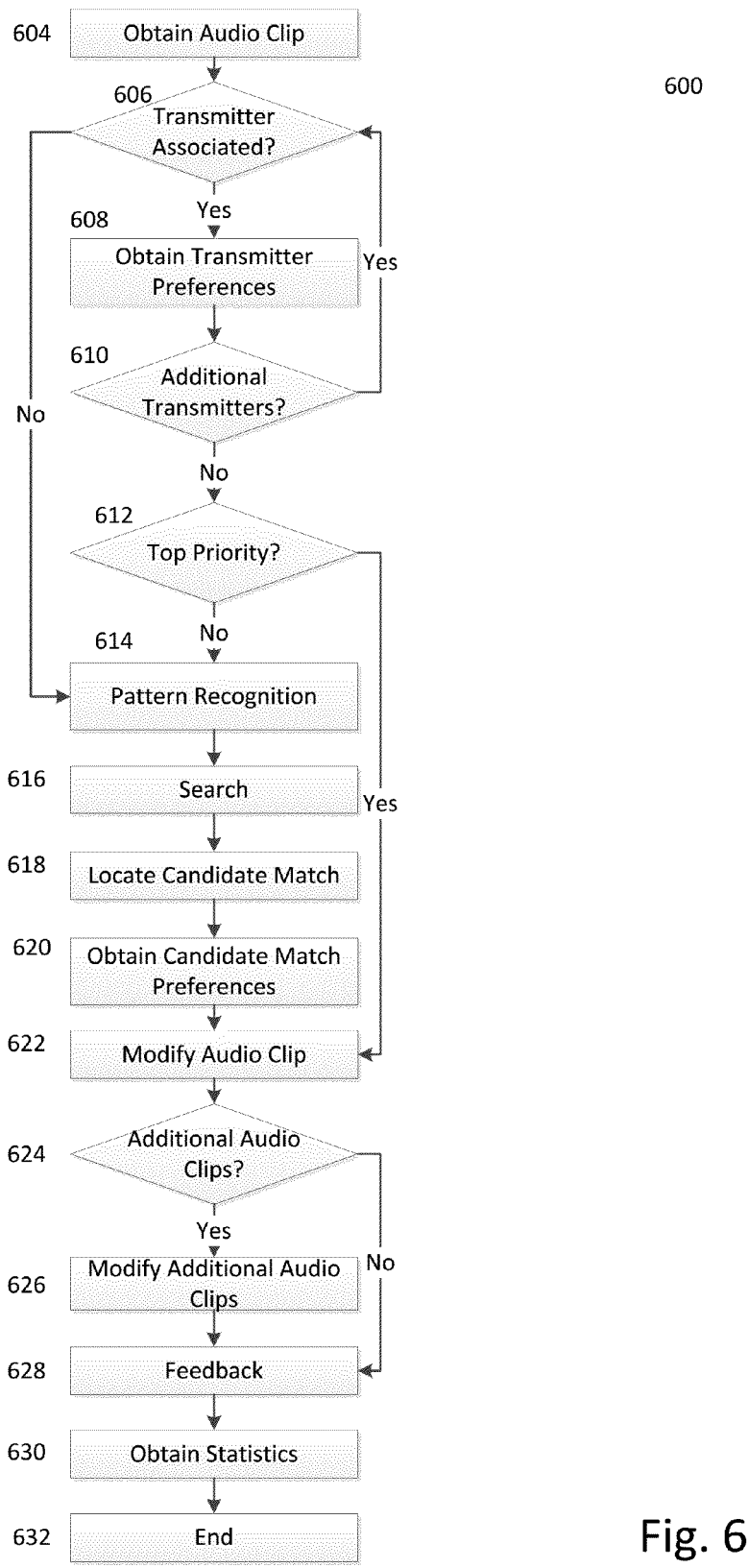
FIG. 6 is a flow diagram illustrating an example process of capturing an audio clip with a head-mounted display using pattern recognition and a transmitter, in accordance with one or more disclosed features described herein.

FIG. 6 is a flow diagram of an example process 600 describing capturing an audio clip with an imaging device, such as the head-mounted display 302, which may use pattern recognition and a transmitter in accordance with aspects of the present disclosure. Process 600 may begin at step 604, in which an audio clip may be obtained and/or recorded by a head-mounted display, such as the head-mounted display 302, using, for example, an audio component, such as the audio component 212, of, for example, the camera 326. In some embodiments, an audio clip may be captured and/or recorded with a remote device, such as audio component located remote to the head-mounted display 302, and subsequently transmitted to the head-mounted display 302. An audio clip may be composed of one or more sounds, which may be associated with one or more objects.

In step 606, it is determined whether a transmitter, such as the transmitter 330, may be associated with the obtained audio clip. As stated above with respect to FIG. 4, the head-mounted display 302 may locate a transmitter 330, such as by detecting a signal, such as the signal 332. In some embodiments, the head-mounted display 302 may determine that a transmitter may be associated with an audio clip by correlating the time the signal 332 that was detected with a time the audio clip was obtained. In some embodiments, the correlation may result from an image (such as described above) captured at substantially the same time as audio clip. In some embodiments, the head-mounted display 302 may require that a threshold value associated with the transmitter and/or signal may be needed to locate a transmitter and/or to detect a signal. The transmitter 330 may be associated with an object 304, which may be, for example, a person. The transmitter 330 may be attached to an object or may be placed adjacent to an object for which it is associated. In other embodiments, the transmitter 330 may be located at a remote location than an object for which it is associated. In some embodiments, the transmitter 330 may be a particular pattern, such as a barcode and/or QR code, which may be, for example, detected by the transceiver 328 or captured in an image 310. According to some aspects, the transmitter 330 may be a proprietary chip, or may be Bluetooth, wireless, or any protocol capable of being transmitted and received, for example, wirelessly by the head-mounted display 302. The transmitter 330 may be an application running on a computing device, such as a mobile device. If it is determined at step 606 that a transmitter may not be associated with the obtained audio clip, then the process continues to step 614, which will be addressed below. If it is determined at step 606 that a transmitter may be associated with the obtained the image 310, then the process continues to step 608.

In step 608, one or more preferences associated with the transmitter may be obtained by, for example, the head-mounted display 302. As stated above, preferences may include instructions regarding how a head-mounted display may interact with an object, such as how to reproduce the audio of an object associated with the preferences and/or transmitter. For example, the transmitter 330 may be configured to trigger the head-mounted display 302 to modify an audio clip captured by the head-mounted display 302 using one or more preferences associated with the transmitter. In some embodiments, the transmitter 330 may broadcast a signal (e.g., the signal 332), which may be received by the head-mounted display 302 using for example, the transceiver 328. The signal may be, for example, a beacon in the non-visible light spectrum that may interact with the head-mounted display 302. The signal may also be a visible light signal that may display a pattern, such as Morse code, and/or one or more colors or shapes. The signal may also include information, such as preferences associated with the transmitter and/or object 304. Preferences may be stored at a remote location, such as in the database 314, another head-mounted display 316, or the remote device 318. In response to locating a transmitter, the head-mounted display 302 may connect with one of these devices, and retrieve the preferences associated with the transmitter. For example, the database 314 may store preferences associated with one or more transmitters, and may provide these preferences to requesting devices, such as the head-mounted display 302. A user may modify preferences associated with a transmitter. For examples, if the transmitter comprises an application running on a computing device (e.g., mobile device), the user may configure the preferences using the application. If, for example, the transmitter comprises a barcode or an application running on a computing device, associated preferences may be stored in, for example, a database, such as the database 314. The user may then access the database 314 to modify any preferences. In some embodiments, preferences may be stored on a remote device, such as the head-mounted display 316 or a mobile device, which may be worn by a user associated with the transmitter 330. Thus, the head-mounted display 302 may connect to the database 314 and/or the remote device directly or through a network, such as the network 320.

In step 610, it is determined whether the head-mounted display 302 detects any additional transmitters, such as by detecting a strong enough signal transmitted from any transmitters. If it is determined at step 610 that the head-mounted display 302 does detect additional transmitters, then process 600 returns to step 606. If it is determined at step 610 that the head-mounted display 302 does not detect additional transmitters, then process 600 continues to step 612.

In step 612, it is determined whether preferences associated with the transmitter have top priority. Priority of preferences associated with the transmitter may be in relation to preferences associated with, for example, a pattern recognition search of a database (which will be described further below). Thus, a user may set the preferences of his device to trump and take precedence over all other preferences associated with the user. For example, a user may set the preferences of his transmitter to take precedence over all other preferences associated with the user. Thus, preferences from other sources, such as from the pattern recognition search for a database, from other transmitters that may influence the audio clip (will be described further below), from other devices, and the like may be overridden by the preferences associated with a transmitter associated with the user. Accordingly, if it is determined at step 612 that preferences associated with the transmitter have top priority, then the process continues to step 622 (which will be described below). One of ordinary skill will recognize that priority may be applied to any of the sources of preferences, and to any of the preferences associated with each source. Thus, if one source with a higher priority than a second source provides a preference for blocking a portion of the audio clip, then the first source may override any other preference directed to a substantially similar thing/preference by the second source. Also, if a source provides conflicting preferences, then a conflicting preference having higher priority may take precedence over a conflicting preference with a lower priority. If it is determined at step 612 that preferences associated with the transmitter may not have top priority, then the process continues to step 614.

In step 614, pattern recognition may be performed on the audio clip. Thus, the head-mounted display 302 may include pattern recognition (e.g., speech or voice recognition) protocols to determine patterns in the audio clip. For example, if audio clip contains audio of a person, then the head-mounted display 302 may use speech recognition to find and analyze one or more characteristics of the person's voice. The speech recognition software may use audio characteristics such the frequency, pitch, tone, timbre, amplitude, duration, and the like. The characteristics may also include distinguishing features, such as lisps, slurring, and the like. Any known speech recognition system, method, algorithm, and/or protocol may be used in accordance with the disclosed features herein. Additionally, pattern recognition protocols may be used to analyze other audio clips. For example, the head-mounted display 302 may use pattern recognition to analyze a works of art, such as recitations of poems, recitations of books, music, and the like, which may or may not also be copyrighted. Additionally, sound associated with other objects and/or animals may be analyzed. Any audio clip that can be captured by the head-mounted display 302 may be analyzed by the pattern recognition in step 614.

In step 616, the head-mounted display 302 may search a database, such as the database 314, for example, based on an audio clip's characteristics, for one or more potential or candidate matches to any of the sounds analyzed in step 614. For example, one or more characteristics such as the frequency, pitch, tone, timbre, amplitude, may be used to search for one or more candidate matches for a sound, such as a person's voice. Additionally, a work of art, such as a poem or copyrighted piece of music may be searched for using characteristics of the sounds of the audio clip analyzed in step 614. In some embodiments, more than one database may be search. In some embodiments, the database may be remote to the head-mounted display 302 or may be local to the head-mounted display 302.

In step 618, it is determined whether there may be any candidate matches found, for example, in the database. For example, one or more sounds of the entries in the database, which may correspond to an object like a person, may substantially or at least partially match an analyzed sound from the captured audio clip. Accordingly, these matched sounds may result in candidate matches for the audio clip and/or one or more sounds in the audio clip. In some embodiments, a percentage-match may be determined, such that the closer the match, the higher the percentage-match. In some embodiments, matches may be ranked according to similarity to the analyzed audio clip and/or one or more sounds in the audio clip (such as based on the percentage-match). Additionally, candidate matches may be for a particular characteristic (such as for frequency). In some embodiments, a threshold, which may be based on a percentage-match, may need to be reached before a match becomes a candidate match. In some embodiments, a limit may be placed on the number of candidate matches. These settings may be implemented in the preferences associated with a candidate match and/or the preferences/settings of the head-mounted display 302 (which may be controlled by some entity, such as the local office 103, entity 217, remote device 318, and the like). If it is determined at step 618 that there may not be any candidate matches found, then the process continues to step 622 (which will be addressed below). If it is determined at step 618 that there may be candidate matches found, then the process continues to step 620.

In step 620, the head-mounted display 302 may access one or more preferences that may be associated with a candidate match. These preferences may be stored in a database, such the database 314. These preferences may be stored remote or local to the head-mounted display 302. For example, if a candidate match has an associated preference of blocking audio, then the analyzed sound in the audio clip may be blocked. In some embodiments, there may be conflicting preferences. For example, if a first candidate match has an associated preference of blocking audio and a second candidate match has an associated preference of distorting audio, then there may be a conflict because the head-mounted display 302 may not be able to block audio and distort audio at the same time. Thus, in some embodiments, a priority may be determined with respect to candidate matches. Priority may be set amongst preferences such that a preference associated with a candidate match having a higher percentage-match may have a higher priority than a preference associated with a candidate match having a lower percentage-match. Other priority may be set. For example, characteristics may be prioritized and/or ranked, such as when a first candidate match has a high percentage-match for timbre, but a lower percentage-match for frequency, and a second candidate match has a low percentage-match for frequency, but a higher percentage-match for timbre. In such an example, if the frequency characteristic has a higher priority than the timbre characteristic, then preferences associated with the first candidate match may be accessed. Alternatively, if the timbre characteristic has a higher priority than the frequency characteristic, then preferences associated with the second candidate match may be accessed. Additionally, preferences may be associated with other items as well. For example, in the copyrighted music example, a candidate match, that may match a copyrighted piece of music, may have associated preferences. For example, a preference may be to block the audio of the copyrighted piece of music, or a preference may be to play another sound. Additionally, preferences may indicate the addition to, subtraction of, and/or alteration of sounds in the audio clip. In some embodiments, preferences may be set such that an audio clip may need to be a certain decibel level before being recorded and/or modified. For example, the preferences may indicate to not record audio associated with whispering (e.g., sounds below a threshold decibel level). Alternatively, recording may be triggered to begin when whispering is detected. In other embodiments, audio may be not recorded and/or modified when key words may be detected. For example, preferences may indicate that any words in proximity to "government" may be blocked or distorted. Thus, audio associated with explicit conversations or conversations about particular topics may be modified based on preferences. Alternatively, key words may trigger a head-mounted display to record words in proximity to the keywords. Preferences will be addressed in more detail below.

In step 622, the audio clip or one or more sounds included in the audio clip may be modified based on any preferences associated with the audio clip, such as from preferences associated with sounds in the audio clip. For example, a person's voice may be blocked based on one or more preferences associated with a candidate match. In another example, a person's voice may go from being blocked (e.g., if this is set as a default setting) to not blocked (e.g., to substantially resemble the person's voice) based on one or more preferences associated with a candidate match. Additionally, preferences may be set for a head-mounted display 302, such that the head-mounted display 302 may perform audio clip/sound modifications based on its own preferences. For example, the head-mounted display 302 may include preferences that may instruct the head-mounted display 302 to block all voices, change everyone's voice to another voice, or block particular sounds (e.g., if the user does not want to record music from a particular band), and the like. Additionally, at step 622, the preferences used in the modification of the captured audio may come from various sources, such as preferences associated with a transmitter (e.g., from step 608), preferences associated with candidate matches, or preferences associated with a head-mounted display, such as the head-mounted display 302. Thus, a priority may be set amongst the sources of preferences. Thus, if a source has a higher priority than another source, such as a transmitter having a higher priority than both the candidate match and head-mounted display preferences, then preferences associated with the transmitter may be implemented before these other two sources. In some embodiments, the priority may be implemented in the preferences themselves. For example, the transmitter preferences may indicate that preferences associated with the transmitter may have a highest priority (e.g., step 612).

In some embodiments, a preference may instruct the head-mounted display 302 to remove a sound from the audio clip and/or mute the sound in the audio clip. In some embodiments, preferences may indicate users and/or head-mounted displays that may or may not be allowed to record a modified audio clip. For example, the preferences (e.g., associated with the object 304) may include a list of approved devices and/or users. Devices on this list may follow preferences (e.g., associated with the object 304) different than devices not on the list of approved devices. For example, preferences associated with the object 304 may instruct head-mounted displays on an approved device list to distort a first portion but not a second portion of the audio clip, and the preferences associated with the object 304 may instruct head-mounted displays not on the approved device list to distort a second portion but not a first portion of the audio clip. In some embodiments, devices on the approved device list may be allowed to capture an unmodified audio clip of, for example, object 304, while devices not on an approved device list (or on an unapproved device list) may not be allowed to capture an unmodified audio clip of, for example, the object 304. In some embodiments, the list may be updated/modified in real-time, such that a person may approve a device immediately. For example, a request to add the device to a person's list of approved devices may be sent to the person, and the person may send an approval or disapproval back to the device. For example, a request may be sent to a computing device associated with the person, such as a head-mounted display or computer associated with the person. The list may be separate from or associated with preferences. In another example, if business associates are in a meeting, a person wearing a head-mounted display may give approval to another head-mounted display located in the room by, for example, a voice command or physical actuation of the head-mounted display. In some embodiments, a business may associate preferences with its employees, such that head-mounted displays, such as the head-mounted display 302, may capture audio clips, which may be modified, according to preferences set by the company. For example, if PEPSI has an agreement with a company, and the company has a number of head-mounted displays associated with it, then a preference may be to always include an audio ad for PEPSI in any audio clips captured by any of the head-mounted displays associated with the company.

In some embodiments, preferences may instruct head-mounted displays to alter the sound of an object 304 if the audio clip is captured in a particular location. For example, an object associated with (e.g., located inside of) or in proximity to a government building may have preferences associated with it such that the object's sounds may be modified when captured or played back. According to some aspects, head-mounted display may not even be able to capture an audio clip in certain locations based on preferences associated with objects in those locations. For example, a government agency may not want any audio clip taken by a head-mounted display within a certain proximity to any buildings or object associated with that agency. Alternatively, certain locations may allow unmodified audio clip to be taken. For example, a person's home (and/or objects associated with the home) may have preferences associated with it or its proximity such that any head-mounted display that comes in proximity to the home or inside of the home may be allowed to take audio clips, such as unmodified and/or modified audio clips. Settings and preferences such as described in the above examples may or may not have priority over other preferences. In such examples, a device (such as a transmitter described above) may trigger these buildings and/or locations (and/or preferences associated with them) to deny, modify, not modify, allow, etc. audio clips captured by a head-mounted display. Alternatively or additionally, preferences may be associated with a GPS location, such that a modification of any audio clips captured/obtained in or from that location may be modified according to those preferences associated with the location. For example, the NFL may not want people attending a sporting event to record sound associated with games, or only allow people who have paid for a service or subscription to be allowed to record sounds associated with games with head-mounted displays. Thus, for example, the NFL may configure preferences associated with a live football game, such as with the stadium, such that certain head-mounted displays (e.g., those with a subscription) may be allowed to record audio clips, such as unmodified audio clips, and certain head-mounted displays (e.g., those without a subscription) may not be allowed to record audio clips or may be allowed to record distorted audio clips.

In some embodiments, preferences associated with a GPS location may be used to modify audio clips with advertisements, such as playing advertisements for products in audio clips obtained of that location. Such preferences may be dynamically changed and/or modified, such as by an entity associated with the advertised product. According to some aspects, a GPS device, such as the GPS 211, may be used to implement embodiments disclosed herein, such as the above black out zone examples. In some embodiments, certain objects, regardless of any other preferences, may appear modified or unmodified in audio clips captured by head-mounted displays. Preferences for such objects may be preset in head-mounted displays. In some embodiments, audio clips may be associated with digital rights management, such that play back or displaying of an image, video, or audio may be performed by a particular set of head-mounted displays or for only a particular number of times, which may also relate to the list of approved devices.

In step 624, it is determined whether there may be additional audio clips and/or sounds associated with the preferences associated with the audio clip and/or one or more sounds included in the audio clip. For example, a head-mounted display may capture additional audio clips of additional secondary sounds (e.g., sounds other than sounds of the object 304). Preferences associated with the analyzed primary sound (e.g., sounds of the object 304) from the audio clip may indicate that these additional secondary sounds, such as in the additional audio clips, may be modified based on the preferences. These additional secondary sounds may be part of the primary sound's profile, and may be associated, for example, with a candidate match or a transmitter. For example, if preferences indicate that a person's son's voice may be blocked, then any audio clips captured by a head-mounted display, such as the head-mounted display 302, may include the blocked son's voice. Thus, pattern recognition may be performed on these additional audio clips to determine any secondary sounds that may be including in a user's profile. In some embodiments, secondary sounds in a user's profile may have their own associated preferences (e.g., preferences associated with a transmitter or candidate match). In such scenarios, a priority system may be used to determine which preferences may be used. Additionally, if a secondary sound that is included in a primary sound's profile is included in the primary audio clip, then the secondary sound may also be modified based on the primary sound's associated preferences. If it is determined at step 624 that additional audio clips may not be associated with the primary audio clip and/or one or more sounds included in the audio clip's preferences, then the process continues to step 628 (which will be discussed below). If it is determined at step 624 that additional audio clips may be associated with the audio clips and/or one or more sounds included in the audio clip's preferences, then the process continues to step 626.

In step 626, the additional audio clips may be modified according to preferences associated with the primary audio clip. As stated above, any other preferences associated with secondary sounds may also be used in the audio clip modification, and may be used according to an assigned priority.

In step 628, feedback regarding any modification (or non-modifications) may be provided. For example, feedback stating that a sound, such as a sound from an object (or audio clips that include secondary sounds), has been modified may be transmitted to a computing device (e.g., mobile device) associated with that object or person. Feedback may include how many devices are playing, recording, or have recorded an audio clip associated with an object, how many of those audio clips are modified or unmodified, and the like. Feedback may be provided about any of the aspects disclosed herein. In another example, feedback stating that work of art, such as a piece of music, has been modified may be transmitted to an entity associated with the work of art. Visible feedback may also be transmitted, such as a light, color, or flash. The feedback may come as an alert, such as in a text message or over social media. Feedback may also be transmitted to objects associated with secondary sounds that may also be modified in audio clips.

In step 630, statistics may be obtained regarding the any modification (or non-modifications). For example, modifications may be tracked and statistics may be obtained regarding a frequency of modification, what sounds (and associated objects) are being modified, which head-mounted displays may be performing modification, locations of where modifications are taken place, and the like. Also, the information regarding the candidate matches may be obtained, which may be used to further modify and refine the searching/matching protocols used in the pattern recognition. The process may end at step 632.

Figure 7:
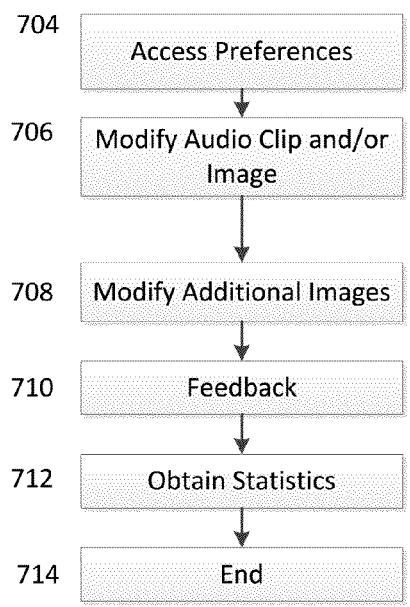
FIG. 7 is a flow diagram illustrating an example process of capturing an image and an audio clip with a head-mounted display using pattern recognition and a transmitter, in accordance with one or more disclosed features described herein.

FIG. 7 is a flow diagram of an example process 700 describing capturing an image and an audio clip with a head-mounted display, which may use pattern recognition and a transmitter in accordance with aspects of the present disclosure. In some embodiments, an image captured by the head-mounted display 302 may be associated with an audio clip captured by the head-mounted display 302. In some embodiments, a captured image may chronologically correlate to an audio clip, such as in a video with audio. In such embodiments, sound captured in the audio clip may correspond to an object currently being imaged. The captured audio clip may have associated preferences that may instruct a head-mounted display to modify an associated image. Additionally, a captured image may have associated preferences that may instruct a head-mounted display to modify an associated audio clip.

Process 700 may begin at step 704, where an image, such as the image 310, and an associated audio clip may have already been captured by a head-mounted display, such as the head-mounted display 302. Also, any candidate matches for a sound in the audio clip and/or an object in the image may have already been found. Additionally, a transmitter may be associated with the audio clip and/or the image 310. In step 704, preferences associated with the image 310 and/or audio clip may be accessed by the head-mounted display 302. As stated above with respect to FIGS. 4-6, preferences may be associated with a candidate match associated with the image 310 (such as an object, person, and/or trademark in the image 310) and/or the audio clip (such as a sound and/or voice in the audio clip). As stated above, the preferences may be prioritized. Additionally, preferences associated with the image 310 may relate to the audio clip. For example, preferences associated with a candidate match (e.g., located using pattern recognition of the image 310) may indicate instructions for controlling audio associated with the image 310, such as to modify audio corresponding to an image in which the candidate match may be displayed. In this case, an audio clip, which may be recorded at substantially the same time as recording the image 310, may be modified such that at least a portion of the audio clip may be modified. For example, a person may set preferences associated with themselves to block the person's voice if a head-mounted display obtains (e.g., captures) an image (e.g., video) of the person. Alternatively, a person may opt-in to allowing their voice to be recorded if, for example, a default setting/preference of a head-mounted display indicates to not record sounds or voices. In some embodiments, the preferences may indicate modifying a particular portion of the audio clip or modifying a particular sound located in the audio clip. These types of preferences may also be applied to, for example, works of art (copyrighted material), trademarks, and/or trademarked items, as well as any other object that may be imaged by the head-mounted display 302. In another example, preferences associated with a candidate match (e.g., located using pattern recognition of an audio clip) may indicate instructions for controlling one or more images associated with the audio clip, such as modifying one or more images corresponding to an audio clip in which the candidate match (e.g., matching sound) may be located. In this case, an image, which may be recorded at substantially the same time as recording the audio clip, may be modified such that at least a portion of the image may be modified. For example, a person may set preferences associated with themselves to blur the person's face if a head-mounted display obtains (e.g., captures) an audio clip of the person. Alternatively, a person may opt-in to allowing their face to be recorded in an image if, for example, a default setting/preference of a head-mounted display indicates to blur or distort faces. In some embodiments, the preferences may indicate modifying a particular portion of the image or modifying a particular object located in the image. These types of preferences may also be applied to, for example, works of art, such as copyrighted material. For example, if an audio clip is being made of a music concert, then preferences associated with that audio clip may indicate that no images may be taken. Preferences may also be associated with transmitter, which may be associated with and audio clip and/or image.

In step 706, one or more audio clips, which may be associated with one or more images, may be modified based on the preferences associated with the one or more images. Additionally, one or more images, which may be associated with one or more audio clips, may be modified based on the preferences associated with the one or more audio clips.

In step 708, any additional audio clips and/or images associated with the preferences may be modified. As stated above with respect to FIGS. 5 and 6, preferences associated with the analyzed primary sound from the audio clip or a primary object from the image 310 may indicate that additional secondary sounds/audio clips and/or images may be modified based on the preferences.

In step 710, as stated above with respect to FIGS. 5 and 6, feedback regarding any modification (or non-modifications) may be provided. Visible feedback may also be transmitted, such as a light, color, or flash. The feedback may come as an alert, such as in a text message or over social media. Feedback may also be transmitted to objects associated with secondary sounds that may also be modified in audio clips.

In step 712, as stated above with respect to FIGS. 5 and 6, statistics may be obtained regarding any modification (or non-modifications). For example, modifications may be tracked and statistics may be obtained regarding a frequency of modification, what sounds/objects (and associated sounds/objects) are being modified, which head-mounted displays may be performing modification, locations of where modifications are taken place, and the like. Also, the information regarding the candidate matches may be obtained, which may be used to further modify and refine the searching/matching protocols used in the pattern recognition. The process may end at step 714.

FIGS. 8-17 illustrate example embodiments in accordance with aspects of the present disclosure. It is noted that aspects, methods, and systems disclosed herein may apply to both images and audio clips obtained and/or captured by the disclosed imaging devices, such as the head-mounted display 302.

Figure 8:
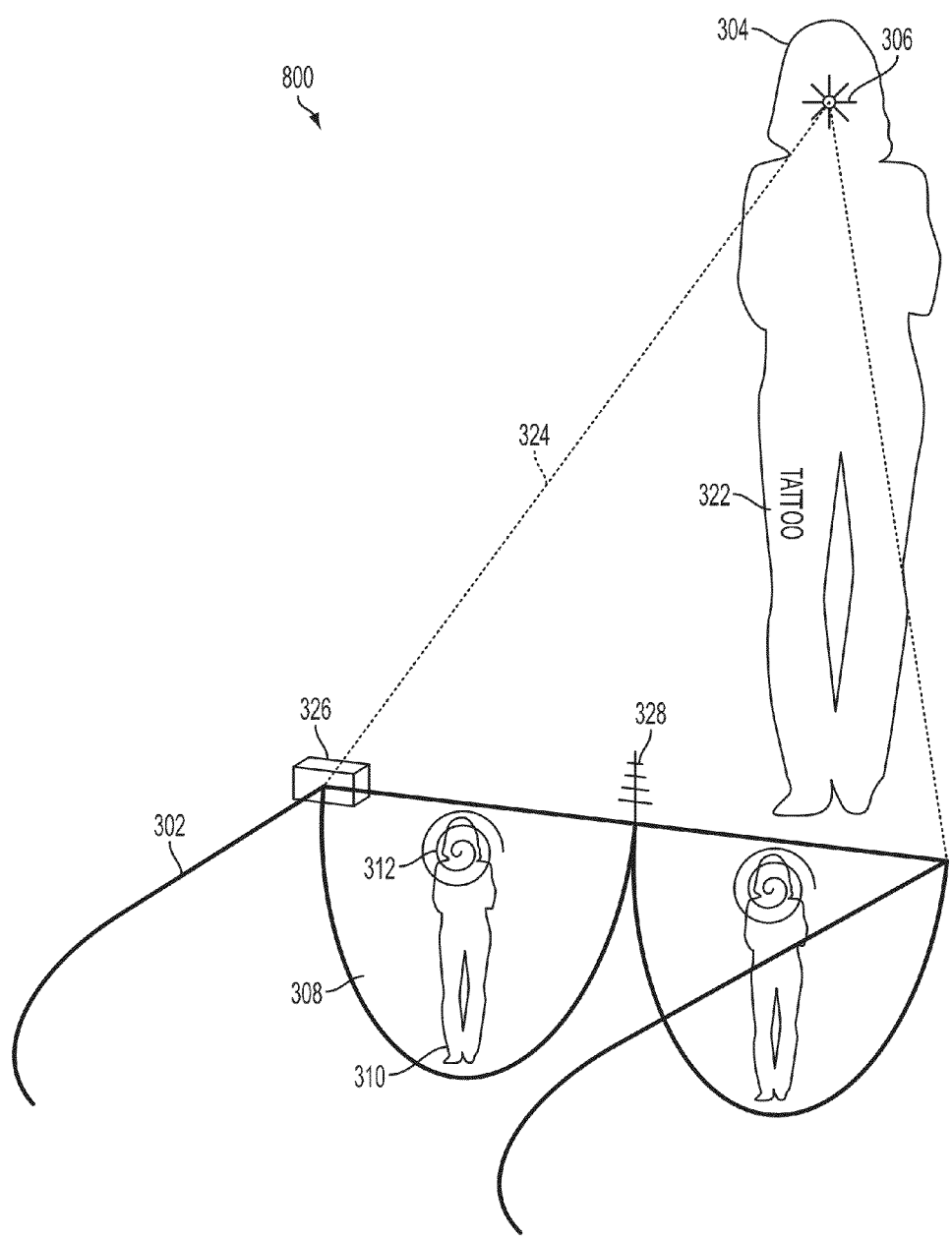
FIG. 8 illustrates a first example head-mounted display system for modifying an image, in accordance with one or more disclosed features described herein.

FIG. 8 illustrates an example system 800 in accordance with aspects of the present disclosure. The system 800 may be similar to the system 300 in FIG. 3. In FIG. 8, the head-mounted display 302 may have captured an image 310 of an object 304, and may display the image 310 on the display 308. The head-mounted display 302 may capture the image 310 using, for example, the camera 326. The object 304 may be a person's body, which may include a distinguishing mark 322, which may be a tattoo, piercing, and the like. The head-mounted display 302 may perform pattern recognition on the image 310 using characteristics of, for example, the mark 322, the person's face or other party of the body, hair, clothes, and the like. Preferences associated with the object 304, such as preferences associated with candidate matches of the object 304, may indicate to the head-mounted display 302 to blur a portion of the object 304 when displayed in the image 310 on the display 308, such as blurring the person's face. Thus, a portion of the image 310 may be blurred, as shown by the modification 312.

Figure 9:
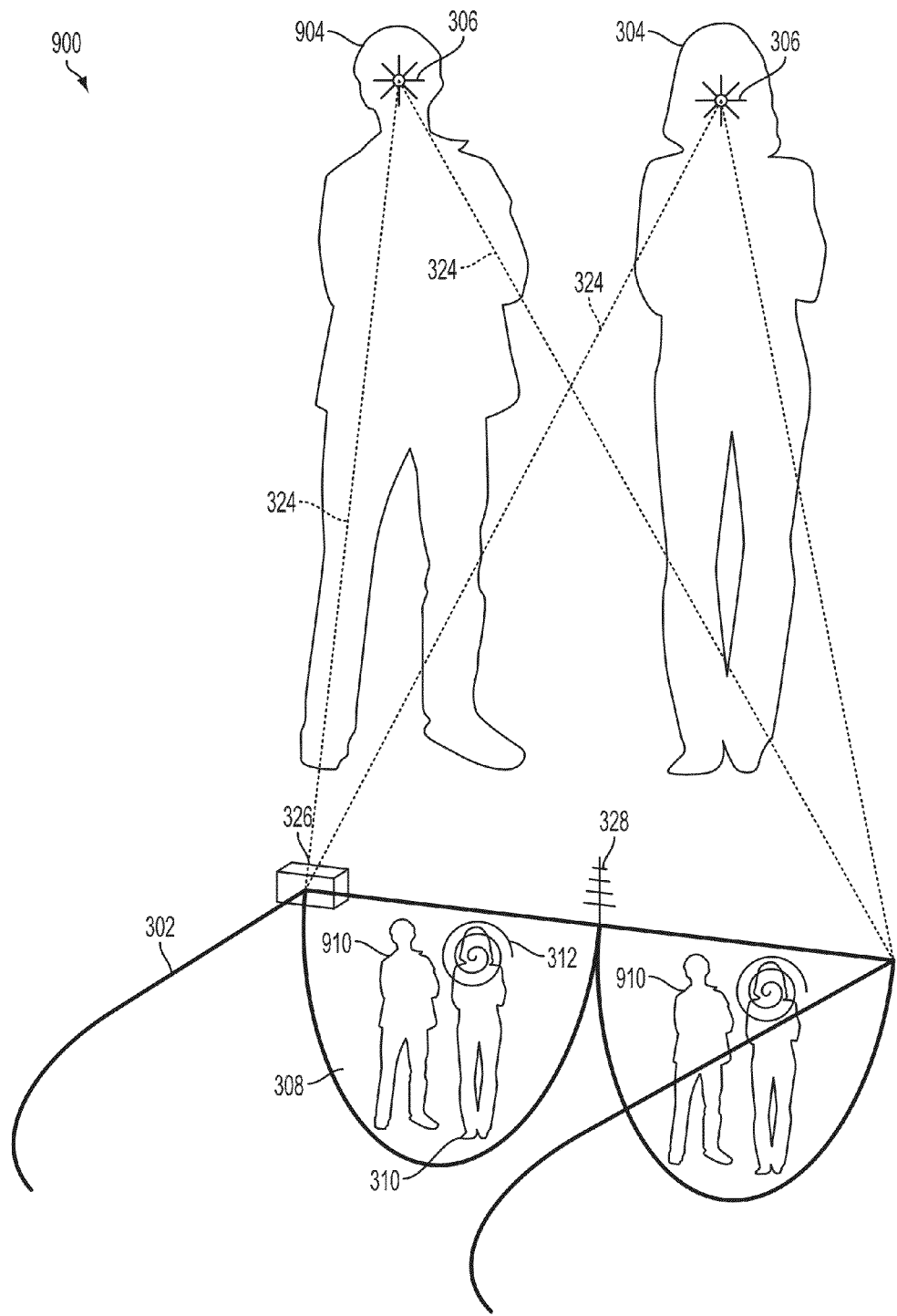
FIG. 9 illustrates a second example head-mounted display system for modifying an image, in accordance with one or more disclosed features described herein.

FIG. 9 illustrates an example system 900 in accordance with aspects of the present disclosure. The system 900 may be similar to the system 300 in FIG. 3. In FIG. 9, the head-mounted display 302 may have captured an image 310 of an object 304 and an object 904, and may display the image 310 on the display 308. The head-mounted display 302 may capture the image 310 using, for example, the camera 326. The object 304 and object 904 may be people's bodies. Head-mounted display may specifically target a portion of an object, such as the object 304, using, for example the focus point 306. The focus point 306 may be used to focus on a portion of an object, such as when there are multiple objects in the vicinity of an object. For example, the head-mounted display 302 may first focus on the object 304 using the focus point 306, perform pattern recognition using characteristics of the object 304, and then use the focus point 306 on additional objects, such as the object 904, and perform pattern recognition using characteristics of the object 904. Alternatively, characteristics of multiple object may be implemented in a substantially simultaneously manner. For example, during real-time imaging (or real-time audio capture), the head-mounted display 302 may need to analyze characteristics of objects (or sounds) immediately. In the system 900, the image 310 displays the modification 312, corresponding to the object 304, and non-modification 910, corresponding to the object 904. Thus, preferences associated with the object 304 may indicate to the head-mounted display 302 to blur a portion of the object 304 when displayed in the image 310 on the display 308. Also, preferences associated with the object 904 (or with the object 304) may indicate to the head-mounted display 302 to not blur a portion of the object 904 when displayed in the image 310 on the display 308.

Figure 10:
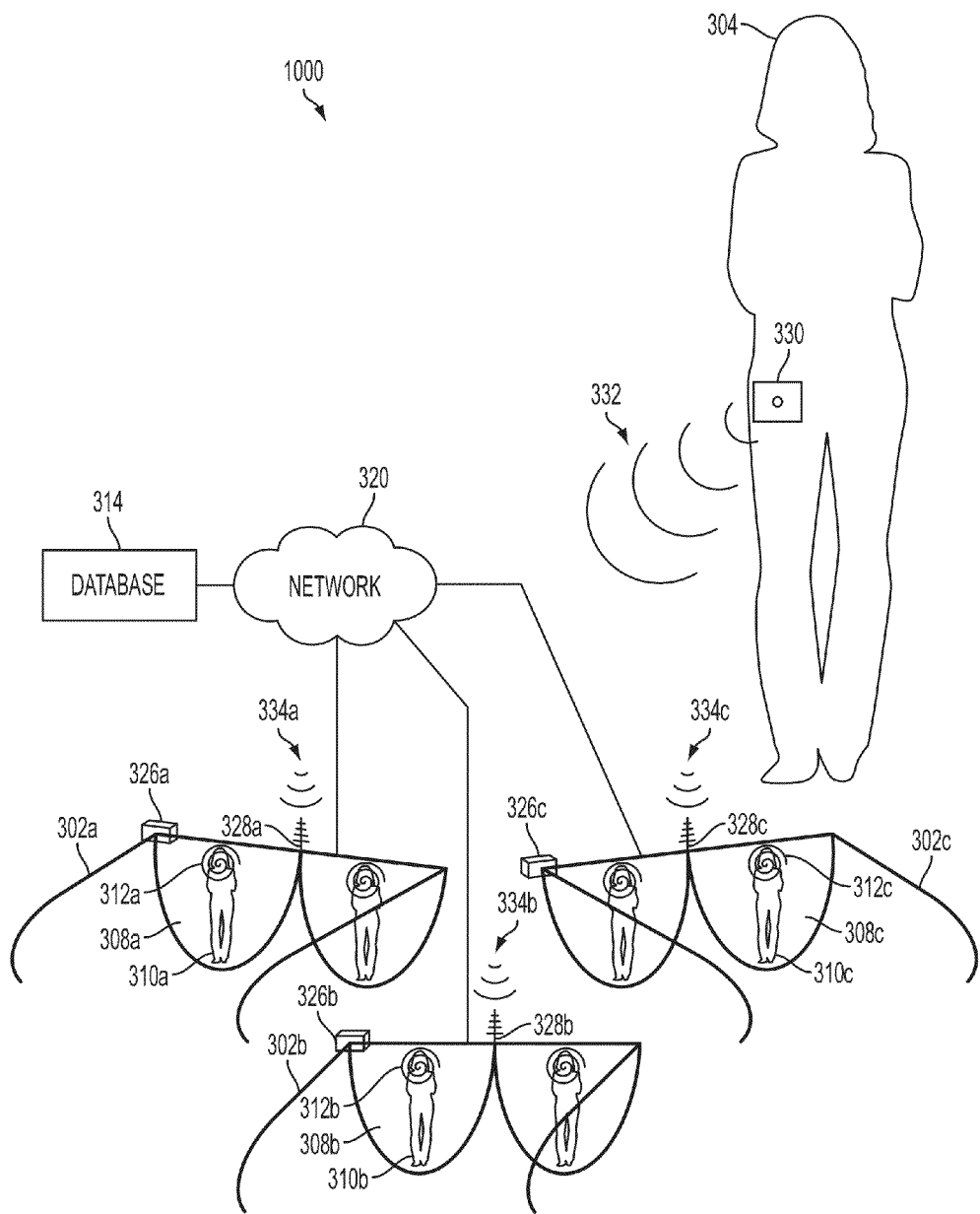
FIG. 10 illustrates a third example head-mounted display system for modifying an image, in accordance with one or more disclosed features described herein.

FIG. 10 illustrates an example system 1000 in accordance with aspects of the present disclosure. The system 1000 may be similar to the system 300 in FIG. 3. In the system 1000, the transmitter 330 may be associated with the object 304. For example, the transmitter 330 may be an application running on a mobile device, or may be a radio-frequency identification device, which may be placed adjacent to the object 304. Transmitter may be broadcasting a signal 332, which may be used by a head-mounted display to access preferences associated with the transmitter. In some embodiments, such as shown in the system 1000, where there may be multiple head-mounted displays, the location of a transmitter may be determined using triangulation techniques using, for example, the signals 334a-c from the transceivers 328a-c and a location associated with the signal 332. In FIG. 10, the head-mounted displays 302a-c may capture an image 310 of an object 304, and may display the images 310a-c on displays 308a-c. The head-mounted displays 302a-c may have located a location of the transmitter 330, and thus may apply preferences to images captured in proximity to the transmitter 330, such as for the object 304. Accordingly, the object 304 may be displayed in the images 310a-c with the modifications 312a-c on the displays 308a-c, which may be indicated by the preferences associated with the transmitter 330, which may be associated with the object 304. In some embodiments preferences associated with the transmitter 330 may be transmitted to the head-mounted displays 302a-c using the signal 332. In some embodiments, the signal 332 may trigger the head-mounted displays 302a-c to access preferences associated with the transmitter 330 from a remote device or database, such as the database 314.

Figure 11:
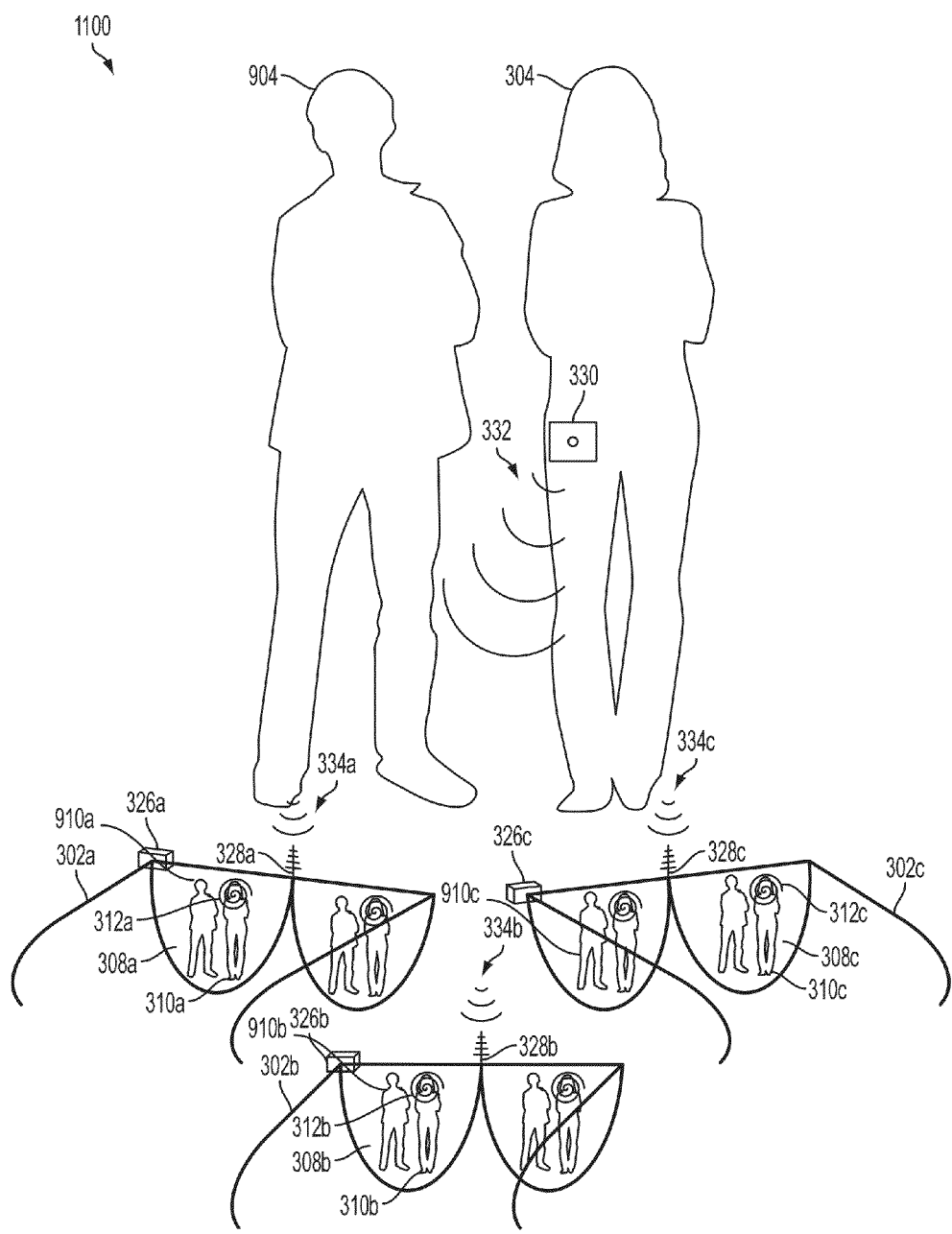
FIG. 11 illustrates a fourth example head-mounted display system for modifying an image, in accordance with one or more disclosed features described herein.

FIG. 11 illustrates an example system 1100 in accordance with aspects of the present disclosure. The system 1100 may be similar to the system 300 in FIG. 3 and the system 1000 in FIG. 10. The system 1100 may include the head-mounted displays 302a-c, each of which may include the transceivers 328a-c. In the system 1100, the transmitter 330 may be associated with the object 304. The object 304 and object 904 may be people's bodies. The head-mounted displays 302a-c may determine the location of the transmitter 330 using, for example, triangulation techniques using, for example, the transceivers 328a-c and a location associated with the signal 332. Thus, the head-mounted displays 302a-c may use the cameras 326a-c to capture the images 310a-c of an object 304 and use preferences associated with the object 304 to modify the images 310a-c (such as shown by the modifications 312a-c). Additionally, when the head-mounted displays 302a-c may have determined a location associated with the transmitter 330, it may be easier for the head-mounted displays 302a-c to determine objects associated with the transmitter 330. Also, the object 904 may not have a transmitter associated with it, and thus, the head-mounted displays 302a-c may use a focus point, such as the focus point 306, to locate and analyze the object 904 to determine preferences associated with the object 904. Thus, distinct preferences associated with the object 304 and distinct preferences associated with the object 904 may be used in the display of the image 310. In this example, the image 310 displays the object 304 with the modifications 312a-c and the object 904 with the non-modifications 910a-c. In some embodiments, a head-mounted display may send information to another head-mounted display. For example, the head-mounted display 302a may capture the image 310a, and then may transmit the image 310a to the head-mounted display 302b using, for example, the transceivers 328a and 328b. A head-mounted display may also transmit preferences to another head-mounted display.

Figure 12:
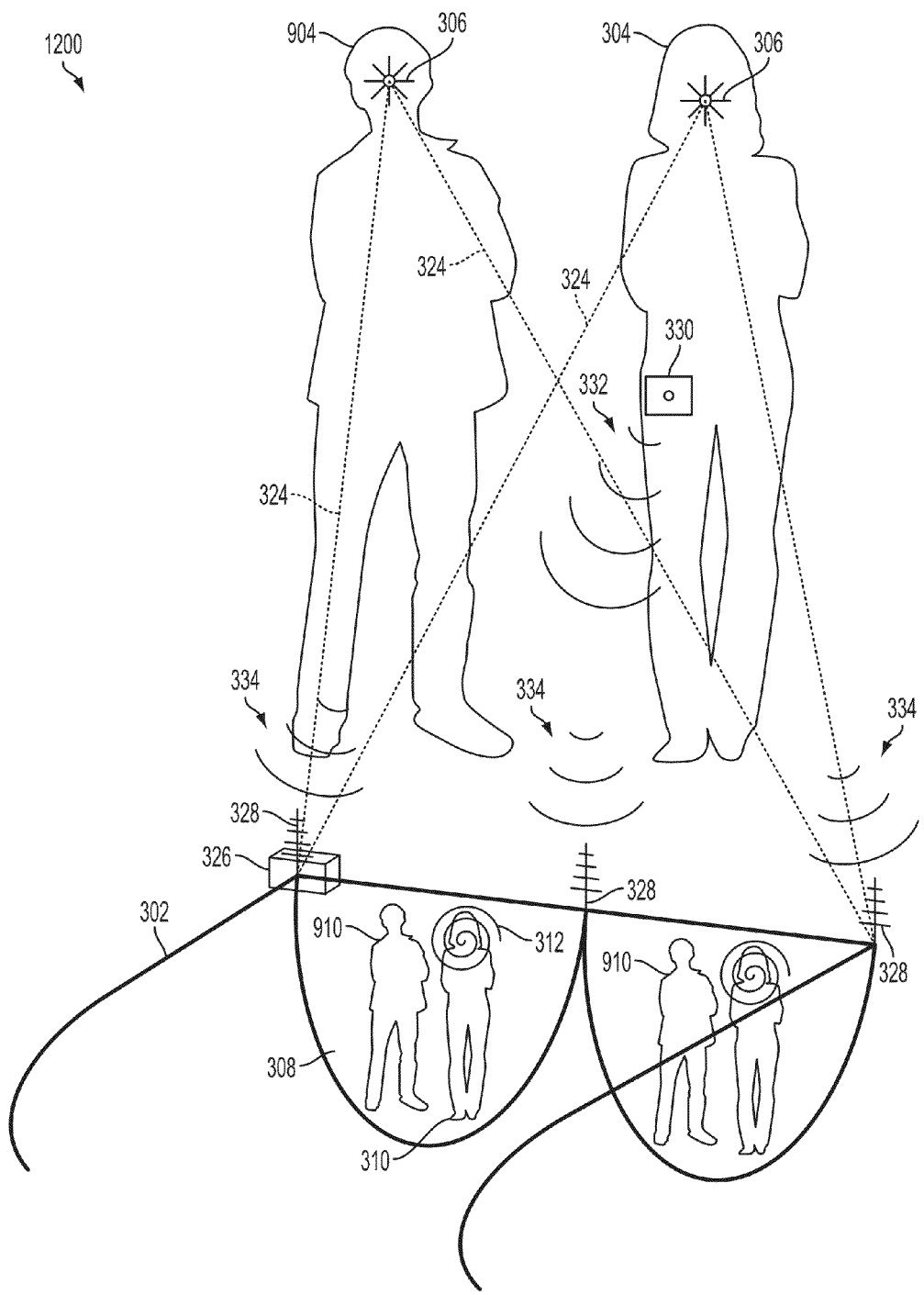
FIG. 12 illustrates a fifth example head-mounted display system for modifying an image, in accordance with one or more disclosed features described herein.

FIG. 12 illustrates an example system 1200 in accordance with aspects of the present disclosure. The system 1200 may be similar to the system 300 in FIG. 3 and the system 1000 in FIG. 10. In the system 1200, the transmitter 330 may be associated with the object 304. The object 304 and the object 904 may be people's bodies. The head-mounted display 302 may locate a transmitter 330 using, for example, triangulation techniques using, for example, one or more transceivers 328 (and the signals 334), which may be coupled and/or attached to the head-mounted display 302. After locating the transmitter 330, head-mounted display may access preferences associated with the transmitter 330. The head-mounted display 302 may also use pattern recognition on an object, such as the object 304 and/or the object 904, to collect any associated preferences. In some embodiments a priority may be established between preferences associated with a transmitter and preferences associated with pattern recognition (e.g., using candidate matches). In some embodiments, the head-mounted display 302 may use transceiver 330 to locate an associated object, and then conduct pattern recognition on the object. Such embodiments may be useful when there may be more than one object in the image 310 and/or the field of view 324.

Figure 13:
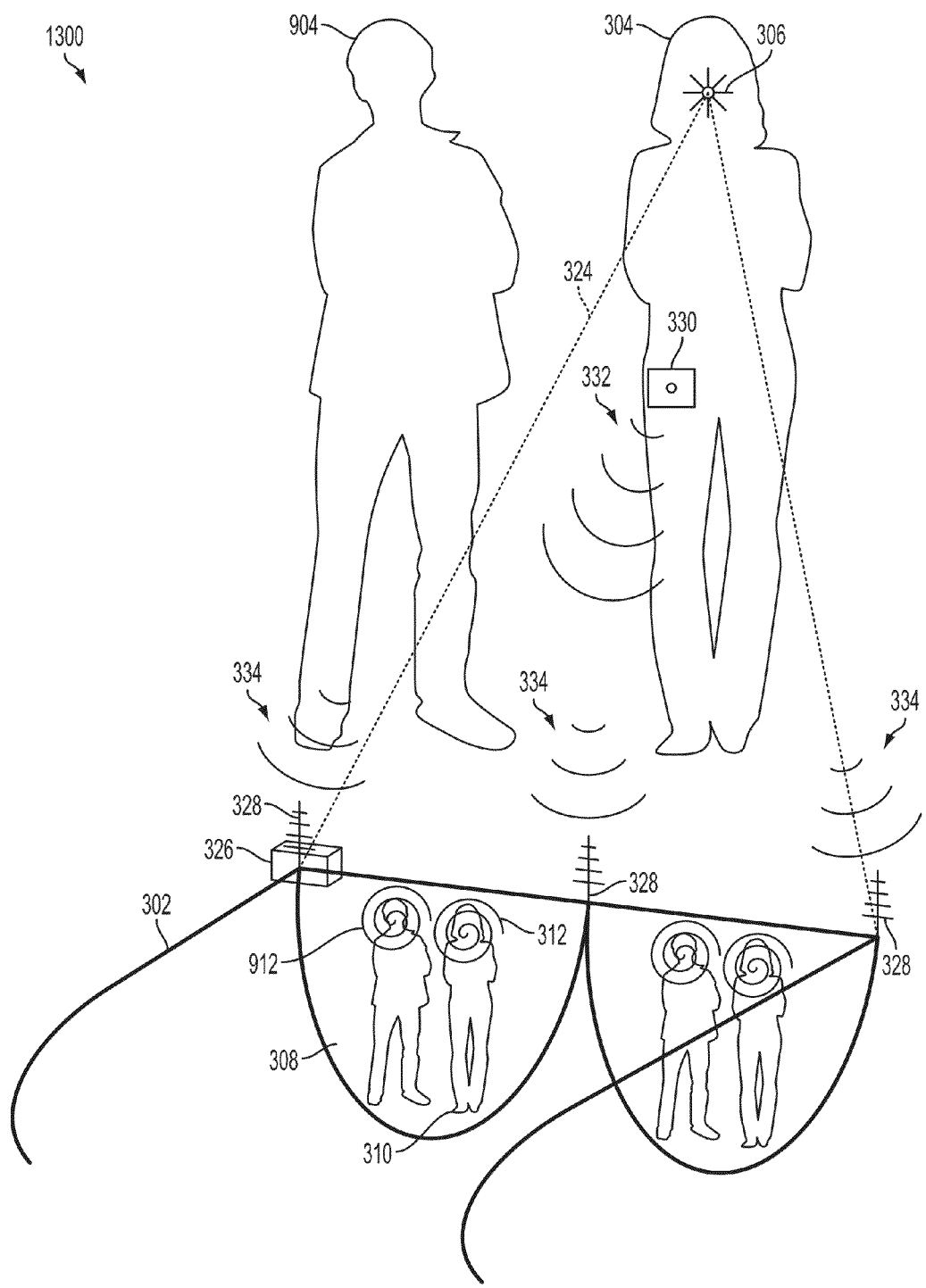
FIG. 13 illustrates a sixth example head-mounted display system for modifying an image, in accordance with one or more disclosed features described herein.

FIG. 13 illustrates an example system 1300 in accordance with aspects of the present disclosure. The system 1300 may be similar to system 330 in FIG. 3 and system 100 in FIG. 10. The object 304 and object 904 may be people's bodies. In the system 1300, the head-mounted display 302 may access preferences associated with the object 304 using, for example, the transmitter 330 and/or pattern recognition. In some embodiments, these preferences may indicate instructions regarding other objects and/or images. For example, as described above, a preference associated with the object 304 may indicate a modification of another object, such as the object 904. Thus, in such cases, after accessing the preferences associated with the object 304, the head-mounted display 302 may display an image 310 that may display modification of the object 304 (e.g., shown by the modification 312) and modification of the object 904 (e.g., shown by modification 912).

Figure 14:
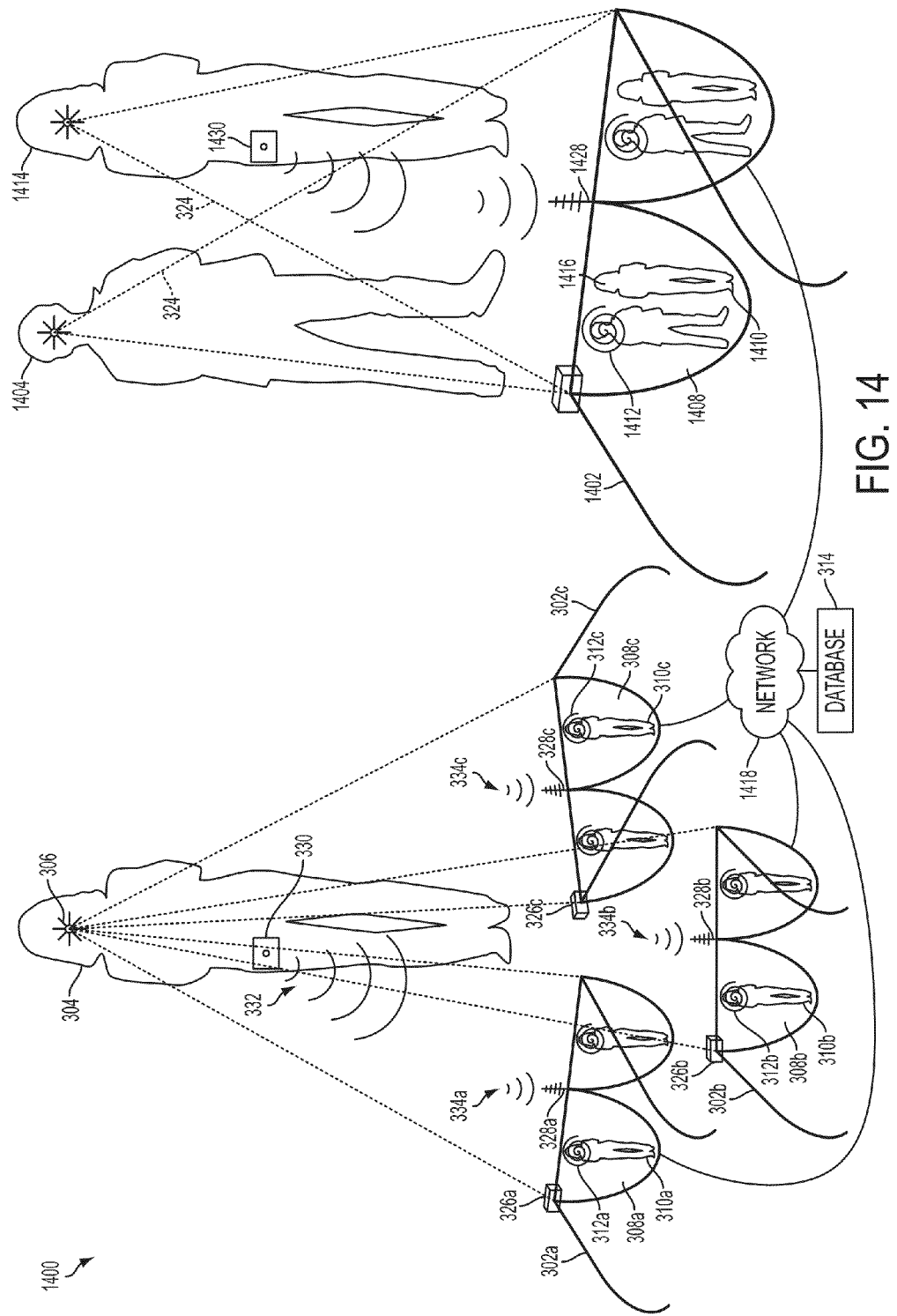
FIG. 14 illustrates a seventh example head-mounted display system for modifying an image, in accordance with one or more disclosed features described herein.

FIG. 14 illustrates an example system 1400 in accordance with aspects of the present disclosure. The system 1400 may be similar to the system 300 in FIG. 3. The system 1400 may include the database 314, which may interact and/or be operably connected to the head-mounted displays 302a-c and the head-mounted display 1402. The head-mounted display 1402 may display on the display 1408 an image 1410 of the object 1404 and object 1414. The head-mounted displays 302a-c may access preferences associated with the object 302 using, for example, preferences transmitted in the signal 332 or stored in the database 314. The signal 332 may also trigger the head-mounted displays 302a-c to access preferences associated with the transmitter 330 from a remote device or database, such as the database 314. The head-mounted display 1402 may use pattern recognition (and/or detect an associated transmitter 1430 detected by a transceiver 1428) on the objects 1404 and/or 1414. After conducting this pattern recognition, the head-mounted display 1402 may interact with the database 314 (and/or with the head-mounted displays 302a-c) and determine that preferences associated with the object 304 may relate to the object 1404 and/or object 1414. For example, the object 1404 may be included in a profile associated with the object 304. The profile might indicate any related objects. Thus, preferences associated with the object 304 may be used to modify images of objects in the profile, such as the object 1404 and/or object 1414. In some embodiments the profile may correspond to a candidate match, which may correspond to the object 304. If preferences associated with the object 304 indicate to modify any images of the object 1404, but not to modify images of the object 1414, then the image 1410, which may be displayed on the display 1408, may display the object 1404 with a modification (e.g., shown by the modification 1412) and may show the object 1414 without a modification (e.g., shown by the non-modification 1416). In some embodiments, the objects 1404 and 1414 may be directly associated with their own preferences. Thus, in some embodiments, preferences, such as those associated with the object 304 and those associated with the objects 1404 and/or 1414, may be prioritized. For example, an object may have set a prioritization such that preferences directly associated with the object may have priority over preferences directly associated with other objects. Also, in some embodiments, feedback may be presented to an object regarding potential modifications, and an object may allow particular modifications based on this feedback. Additionally, the head-mounted displays 302a-c may interact and/or be operably connected to the head-mounted display 1402. Thus, preferences may be shared among the head-mounted displays 302a-c and the head-mounted display 1402, and all the devices may be aware of each other, which may form an ad hoc network 1418 (which may be the same, comprise, be included in, or be substantially similar to the network 320). The network 1418 may include head-mounted displays within a certain proximity to each other, such that any device in the network 1418 may share preferences and other information, and thus may create a database that may be more particular than the database 314. Such a directory may include information and preferences associated with any of the devices in the network. Alternatively, such a directory may include preferences and information that users may want to share with other devices, which may be part of a user's list of approved devices. Thus, the head-mounted display 1402 may detect other head-mounted displays in proximity to it, and determine if any information may be shared with these other head-mounted displays, which may be based on a list of approved devices associated with the head-mounted display 1402. For example, users may use head-mounted displays to image an NFL football game, and thus these head-mounted displays may be able to share information with each other through a network, such as the network 1418. This will be discussed in greater detail below.

Figure 15:
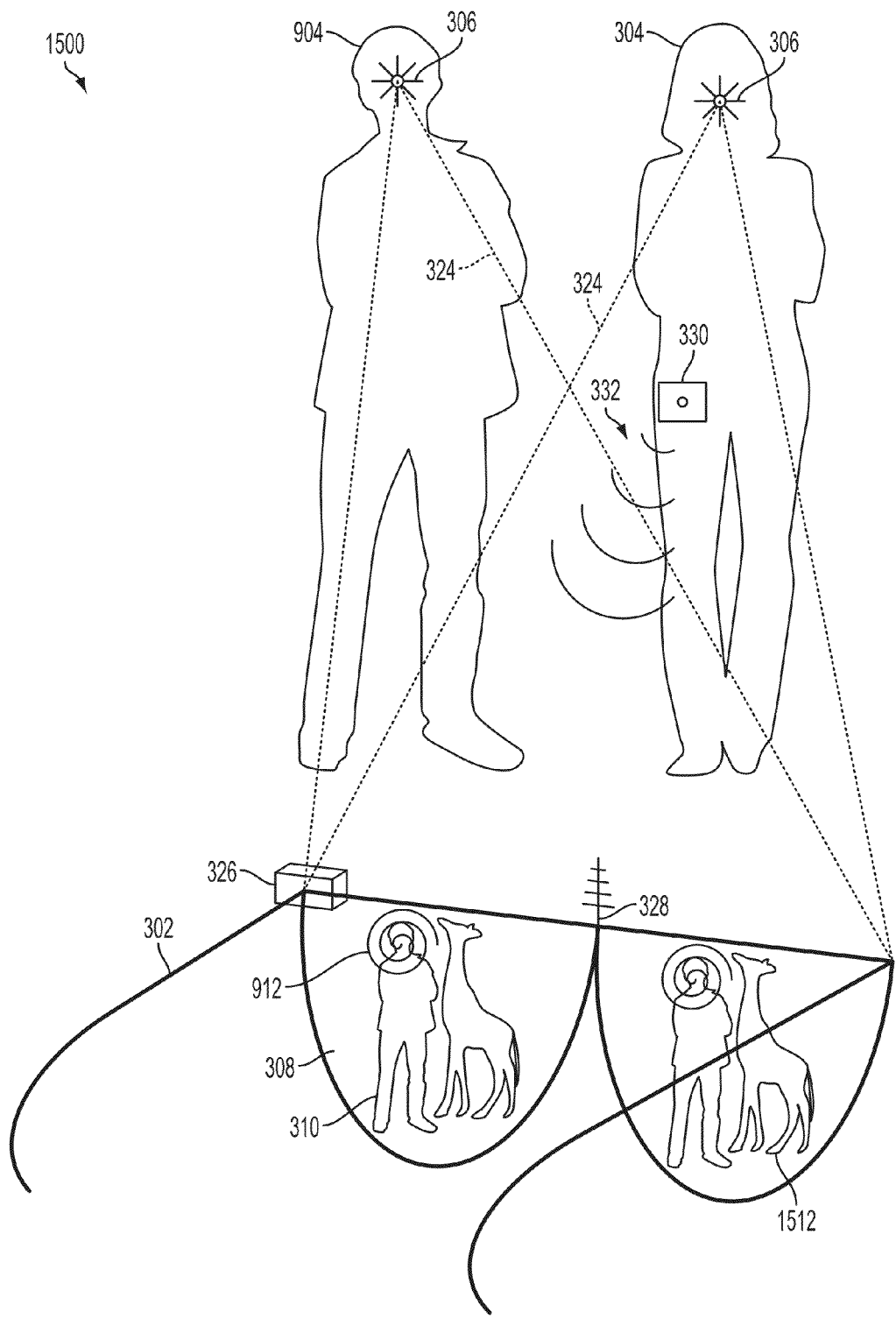
FIG. 15 illustrates an eighth example head-mounted display system for modifying an image, in accordance with one or more disclosed features described herein.

FIG. 15 illustrates an example system 1500 in accordance with aspects of the present disclosure. The system 1500 may be similar to the system 300 in FIG. 3. The object 304 and object 904 may be people's bodies. The head-mounted display 302 may access preferences associated with the object 304. Such preferences may be associated with the transmitter 330 and/or pattern recognition. The preferences associated with the object 304 may include instructions to modify an image of the object 304. For example, the preferences may indicate to the head-mounted display 302 to modify the display of the object 304 in the image 310.

In some embodiments, the modification may be to display an icon or figure, such as an avatar, which may correspond with objects, such as the object 304. According to some aspects, a portion of the object 304 may be displayed with or as an avatar in the image 310. For example, the color of a shirt or hair color may be changed from one color to another color. Or a person may replace an image of their face with a glamorous image of their face whenever their image may be captured. In some embodiments, a person may want to not show any marks, such as tattoos or blemishes on their body, and thus may modify the image of them such as by not showing the marks. Thus, if a person wakes up with acne one morning, the person can configured their preferences to show an image of their face without the acne. Additionally, a person may add items to their image, such as tattoos and the like. In some embodiments, an avatar may comprise a series of images (such as an animated GIF and/or video clip). For example, a person (or other object) may implement their avatar to be an animated GIF of a famous actor (e.g., Brad Pitt) that may be laughing.

Thus, a transmitter (or via a focus point 306) may instruct the head-mounted display 302 to locate an object associated with the transmitter (or candidate match), determine a location of the object's shirt or hair, and adjust the color accordingly. The color may be adjusted using, for example, a color map, filer, or other color manipulating scheme. In some embodiments, the head-mounted display 302 may, for example, overlay a color correction filter, for example, that may cause a user to perceive the shirt or hair in a different color. The color correction filter may be included on a portion of the display 308, such that a user looking through the display 308 may see the modified the image 310. In another example, a portion of or entire object may be replaced with an image of another object. Thus, preferences associated with the object 304 may include a desired image and/or 3D model of how an object should appear in the display 308. The head-mounted display 302 may then access these preferences and display the desired image in the display 308, which can be shown with an avatar 1512 in FIG. 15. The avatar 1512 may replace the object 304 in the image 310. Additionally, any preferences associated with other objects in, for example, the field of view 324 may be implemented for those objects. Thus, as shown in FIG. 15, the object 904 may have preferences associated with it that may include personal/direct preferences, preferences associated with the object 304 that may be relate to the object 904 (as described in FIGS. 13 and 14), and the like. These preferences may indicate to the head-mounted display 302 to, for example, blur the face of the object 904 in the image 310. Thus, the object 904 may be shown with modification 912. In some embodiments, a plurality of avatars and/or modifications may be displayed in the image 310.

Figure 16:
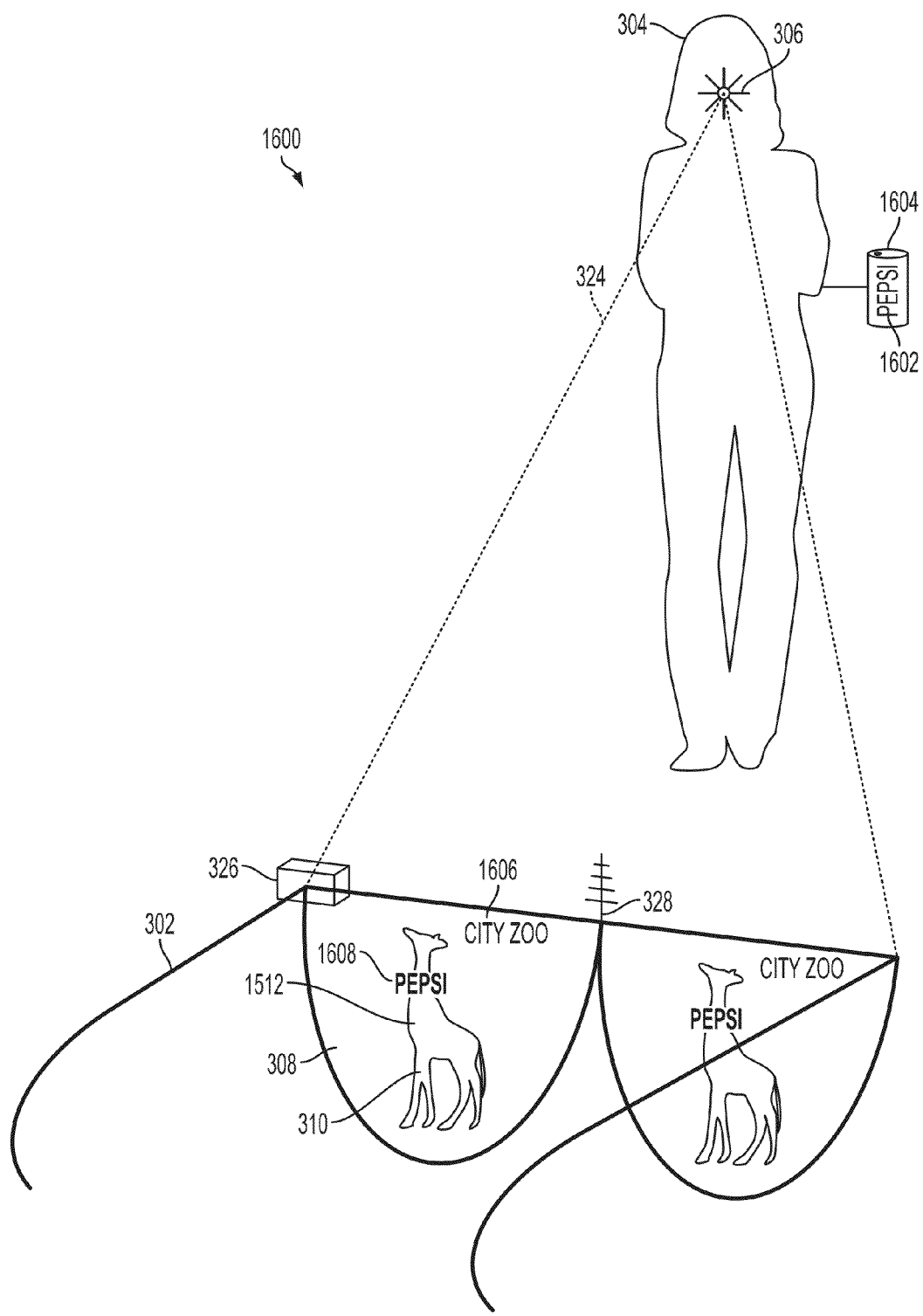
FIG. 16 illustrates a ninth example head-mounted display system for modifying an image, in accordance with one or more disclosed features described herein.

FIG. 16 illustrates an example system 1600 in accordance with aspects of the present disclosure. The system 1600 may be similar to the system 300 in FIG. 3. The object 304 may be a person's body. The object 304 may be associated (e.g., holding) an object 1604, which may be, for example, a can of soda. The object 1604 may include patterns, such as a trademark 1602. The head-mounted display 302 may access preferences associated with the object 304 and the object 1604. Such preferences may be obtained using a transmitter and/or pattern recognition. The preferences associated with the object 304 may include instructions to modify an image of the object 304. The preferences associated with the object 1604 may include instructions to modify an image of the object 1604. For example, the preferences may indicate to the head-mounted display 302 to modify the display of the object 304 and/or the object 1604 in the image 310. Such a modification of the object 304 may be to display an avatar, such as shown by the avatar 1512 in the image 310. The preferences associated with the object 304 may also include showing an advertisement in the image 310 or the display 308, such as shown by an advertisement 1606. The advertisement 1606 may be related to the avatar 1512, such as an advertisement for a zoo when the avatar 1512 resembles an animal like a giraffe. In some embodiments, such preferences may be related to a location of the image 310 or the head-mounted display 302. For example, if a user of the head-mounted display 302 may be located in proximity to a zoo, then an advertisement and/or avatar that may be related to the zoo may be displayed in the display 308. Additionally, object 1602 and/or trademark 1604 may be associated with preferences that may instruct how it appears in the image 310 and/or the display 308. For example, these preferences may instruct the head-mounted display 302 to display an advertisement or coupon that may be related to object 1602 and/or trademark 1604 (shown by advertisement 1608). Thus, if a user is in supermarket, and uses the head-mounted display 304 to image or view products, then coupons and/or advertisements related to those products may appear on the display 308.

Figure 17:
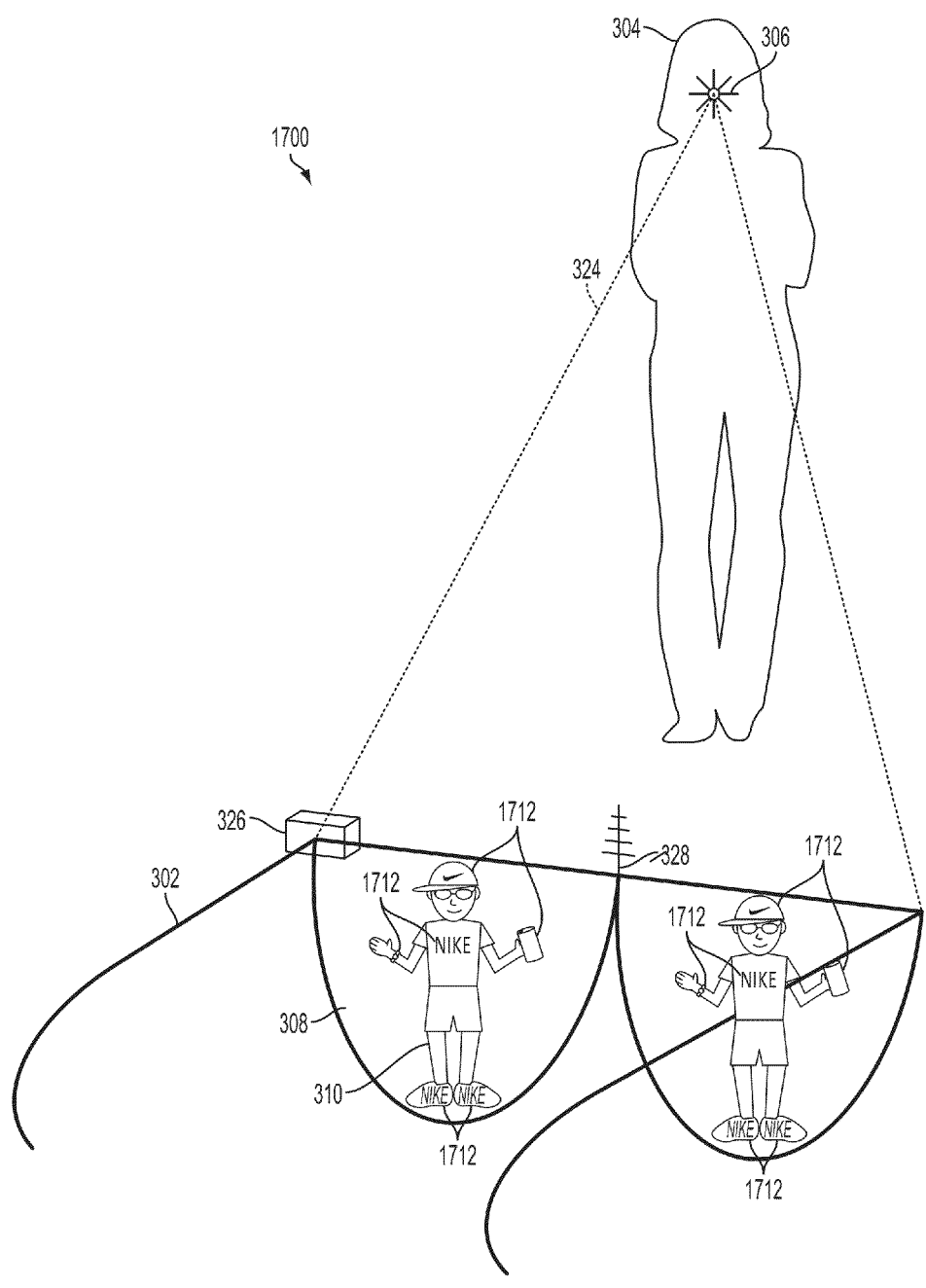
FIG. 17 illustrates a tenth example head-mounted display system for modifying an image, in accordance with one or more disclosed features described herein.

FIG. 17 illustrates an example system 1700 in accordance with aspects of the present disclosure. The system 1700 may be similar to the system 300 in FIG. 3. The object 304 may be a person's body. The preferences associated with the object 304 may include instructions to modify an image of the object 304. For example, the preferences may indicate to the head-mounted display 302 to modify the display of the object 304 in the image 310. Such a modification of the object 304 may be to display an avatar in the display 308. For example, the object 304 may be a celebrity, such as an athlete. The athlete may have agreements with various commercial entities to, for example, endorse products sold or made by those entities. According to some aspects, preferences associated with the athlete may indicate to display various products on the display 308. Such preferences may be controlled by various entities, such as the commercial entities. For example, preferences associated with the object 304 (e.g., an athlete) may include displaying NIKE shoes, shirt, and hat, a PEPSI bottle, RAY-BAN sunglasses, and a ROLEX watch. Such modifications/avatars may be shown by the modifications 1712 in FIG. 17. In some embodiments, using audio may be implemented for a modification of an image. For example, if audio of a baseball game is captured by the head-mounted display 302, then, after analyzing that audio, avatars and/or advertisements related to baseball may be displayed on the display 308. In some embodiments, preferences associated with an object may instruct head-mounted displays to use avatars periodically, such as every hour, every Tuesday, this period of the day, these particular days, and the like. In some embodiments, statistics may be collected based on how many head-mounted displays and/or viewers actually imaged or saw such avatars (e.g., the products), and may be transmitted back to one or more entities associated with such avatars. These entities may then develop a revenue plan based on these statistics. In some embodiments, objects may be associated with other objects in images. For example, if a user uses the head-mounted display 302 to image a tie in one image and then himself in another image (e.g., using a mirror or having another user do it), the user can, for example, overlay the tie on the user and display this image. Thus, a user can virtually try on items in a store. A user may also overlay the tie on another object. This can apply to objects in the same image as well. Additionally, statistics may be collected based on what objects may have been imaged with what type of products, the number of products imaged, whether a user sees an advertisement and the medium of that advertisement (such as a billboard, magazine ad, television ad, computer/mobile device ad, head-mounted display, and the like), the number devices that imaged a trademark or trademarked product, the number of devices that imaged a celebrity, the number of devices that imaged a particular show or episode, the number of people imaging in a particular location like a football or city, and the like. Statistics may be collected based on whether a user accessed an advertisement or coupon, whether a user purchased a product or trademark that may have been displayed, whether a user performed an activity associated with a displayed product or trademark. Statistics may be collected based on whether a user fast forwarded or rewound a television show or movie, whether ads may have been fast forwarded through or rewound, and the like. These statistics may also be collected for audio clips and sounds as well.

Figure 18:
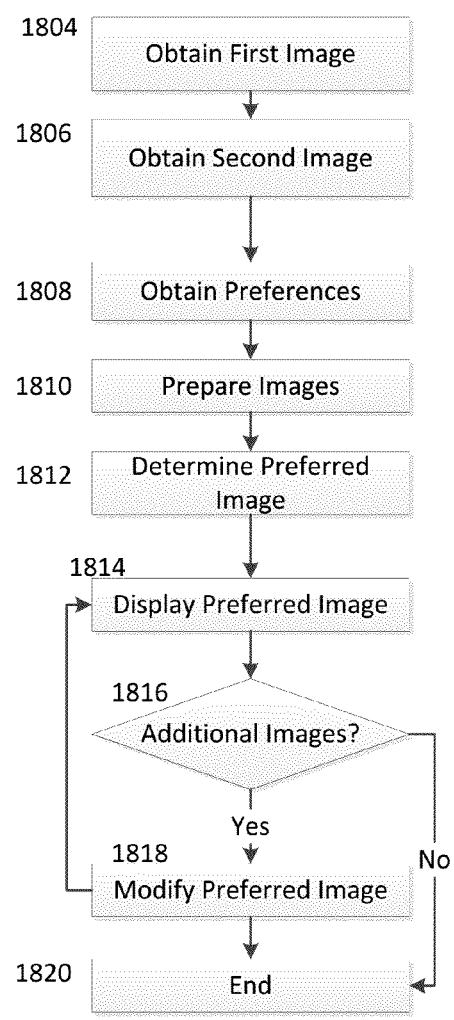
FIG. 18 is a flow diagram illustrating an example process of obtaining images with one or more head-mounted displays to generate one or more preferred images, in accordance with one or more disclosed features described herein.

FIG. 18 is a flow diagram of an example process 1800 describing capturing images with one or more head-mounted displays to generate one or more preferred images, which may use pattern recognition and a transmitter in accordance with aspects of the present disclosure. The process 1800 may begin at step 1804, in which a first image of an object may be obtained by the first head-mounted display. In some embodiments, the first image may be captured by a first head-mounted display. In other embodiments, the first image may be transmitted to head-mounted display from, for example, a remote device, such as another head-mounted display, computing system, and the like. The first image may be of an object at a first angle. For example, an image of a football game may be captured by a user of the first head-mounted display at a first angle.

In step 1806, a second image of an object may be obtained by a second head-mounted display. In some embodiments, the second image may be captured by the second head-mounted display. In other embodiments, the second image may be transmitted to head-mounted display from, for example, a remote device, such as another head-mounted display, computing system, and the like. The second image may be of an object at a second angle, which may be of a substantially similar or different angle than the first angle. For example, an image of a football game may be captured by a user of the second head-mounted display at a second angle. In some embodiments, the first image and second image may be of substantially the same objects, different objects, and/or may not include a common object.

In step 1808, preferences associated with an object displayed in the first image and/or second image may be received by the first head-mounted display and the second head-mounted display. As described above, such preferences may be, for example, associated with a transmitter associated with the object and/or associated with pattern recognition. In some embodiments, the preferences may be received from, for example, an entity associated with the local office 103. The preferences may instruct the head-mounted displays to, for example, block recording of the football game, allow recording of the football game, allow sharing of images of the game, allow modification of the images of the game, and the like. Such preferences may also be based on a location of a head-mounted display, such as allowing users within proximity to the item (e.g., users of head-mounted displays currently at a stadium) to access and share images. In some embodiments, the preferences may include permission to access the image by an entity that may, for example, be associated with a captured object in the image. For example, if the images are of an NFL game, then the NFL may request permission from the head-mounted displays (and/or users of the head-mounted displays) to access and/or use a captured image. Such an image may be used by the NFL to, for example, show replays of a play at, for example, various angles that may have happened during the game. Additionally, the NFL may want to transmit an image captured by a head-mounted display to other users viewing the game (such as viewers not attending the game) and/or other head-mounted display or non-head-mounted display users at the game. In some embodiments, preferences may include allowing devices with other criteria such as satisfying a passcode and the like. For example, a code may need to be entered by a user of a head-mounted display device before being allowed to record and/or share images of an NFL game. Such a code may be a code related to a network, such as an access key, which may be automatically determined and entered based on a location of the head-mounted display. Alternatively, the code may be, for example, a sequence from the user's ticket to the game. In some embodiments, an imaged object may have preferences associated with it that instruct a head-mounted display to modify the image (e.g., with distortion, blurring, and/or avatar). In such cases, the modified image may be used in, for example, process 1800.

In step 1810, the first and/or second images may be prepared for analyzing. For example, the images may be transmitted to an entity for analyzing. The entity may be, for example, an entity associated with an object captured in the images. For example, images of an NFL game may be transmitted to the NFL for analyzing. Alternatively or additionally, images of an NFL game may be transmitted to another head-mounted display or other entity, which may be a remote device or database, for example. In some embodiments, a head-mounted display that may have captured an image may receive other images in step 1810.

In step 1812, a preferred image may be determined by, for example, an entity that may have received the images in step 1810. In some embodiments, a preferred image may be one or more of the received images that may convey more preferred information than another image. For example, an image that may clearly show that a player fumbled a football may be a more preferred image for the NFL than an image that may not clearly show that a player fumbled a football. In some embodiments, a preferred image may be a combination of received images. For example, a panoramic image may be created by using images of one or more objects at different angles. Panoramic images may also be created using images that may not be of the same object and may or may not be at different angles. For example, a first image may be of a first portion of a stadium, and a second image may be of a second portion of a stadium. The first and second portions may overlap (i.e., have one or more common objects) or may not overlap (i.e., not have one or more common objects). Thus, a preferred image in this example may be a panoramic image that uses the two images, such as merging the two images to create, for example, a composite image. Alternatively, if the images do not overlap, an interpolated preferred image may be created using the two images. In some embodiments more than two images may be used according to disclosed aspects. Thus, in the previous panoramic example, additional images may be provided to supplement the creation of the preferred image. In some embodiments, a preferred image may be created based on preferences/setting of a head-mounted display. For example, a user may indicate in the preferences of the head-mounted display one of the two teams currently playing as his favorite of the two. Thus, a preferred image for this user/head-mounted display may be an image showing his favorite team. Alternatively, a preferred image may be an image showing the other team fumbling the ball, for example. In some embodiments, the images may be used to create an image with an increased resolution (e.g., pixel resolution, spatial resolution, spectral resolution, temporal resolution, and the like). For example, the images may be used to produce preferred images with a high definition resolution, such as 4K, 8K, and 16K resolution. Images from various angles may be interpolated to produce preferred images with an increased resolution. Any known protocol or process may be used to increase the resolution. In some embodiments, a three dimensional (3D) preferred image may be created.

In step 1814, a preferred image may be displayed. The preferred image may be displayed on any number of displaying devices, such as head-mounted displays, devices associated with premise 102, devices associated with the local office 103, devices associated with any of the above entities, and the like. According to some aspects, a preferred image may be transmitted back to one of the head-mounted displays that captured or obtained the initial images used to create the preferred image. For example, the first head-mounted display could obtain a preferred image for display. According to some aspects, a preferred image may be transmitted to a display device associated with the premises 102, such as to a home or business. For example, the preferred image may be included in a television broadcast. According to some aspects, users may receive a preferred image based on preferences (settings) associated with the users. For example, a user of a head-mounted display who may be at a stadium watching a football game may have a preferences associated with the user's head-mounted display which allows him to see his favorite player whenever the user desires. The user may display on the head-mounted display the preferred image by using, for example, voice commands, physical actuation, automatic display, and the like. The preferred image may be created using images obtained of the player by other head-mounted displays located at the stadium. Thus, the preferred image may alternate based on which of the images obtained by the other head-mounted displays produces the best image (e.g., best shot of the player catching the ball, best shot of the player throwing the ball, best shot of a hit on the player, etc.). Referring to the above example with respect to the favorite team, a preferred image of the user's favorite team may be displayed on, for example, the user's head-mounted display. In some examples, an entity, such as the NFL, may collect images from different angles from many different head-mounted displays, determine a preferred image from those images, and display the preferred image as, for example, a replay of a play. In some embodiments, a preferred image may be displayed from among images captured by head-mounted displays listed on a list of approved devices and/or in an ad hoc network. In some embodiments, a preferred image may be transmitted to a head-mounted display from an entity associated with the local office 103. For example, images of a weather event, such as a tornado, may be captured by head-mounted displays, transmitted to an entity associated with the local office 103, where a preferred image may be created/determined, and transmitted to televisions, head-mounted displays, wireless devices, computing devices, or transmitted back to the head-mounted displays that captured the images (e.g., to alert them to impending danger or to an escape route). Additionally, head-mounted displays may capture images of a missing person, such as a child. Such images may be transmitted to an entity, where a preferred image may be created from those images, and then having the preferred image transmitted to devices, which may be used to help locate/find the missing person. Users may have preferences associated with their head-mounted displays (and/or other devices), such that alerts, such as a news alert or missing person alert, may or may not be received. According to some aspects, users associated with the premises 102 and/or set-top box 113 may also configured preferences, such that a preferred image may be displayed based on these configured preferences. Thus, an event being broadcast to a number of viewers may include different images based on preferences associated with those viewers and/or devices associated with those viewers. Additionally, head-mounted displays may receive preferred images based on a geo-location and/or proximity to an item. For example, head-mounted displays located at a stadium may receive preferred images from a game being played at the stadium. Additionally, if a user travels to California, then images received by the user's head-mounted display may be related to California. Thus, many preferred images may be created of an object, and head-mounted displays may receive one or more of these preferred images based on setting/preferences associated with the individual head-mounted displays, the object, and/or an entity associated with the object and/or preferred images.

In step 1816, it is determined whether additional images have been obtained and whether these images may be used to modify the preferred image. Such additional images may be obtained of different objects, at a different angle, at a different location, at a different time, and the like. In some embodiments, the additional images may be obtained by a head-mounted display (e.g., one of the first or second head-mounted displays that produced the first and second images or a different head-mounted display). In some embodiments, the additional images may be obtained by other devices, such as a camera, computing device, and the like. In some embodiments, the additional images may be captured before the first or second images may have been captured. If it is determined at step 1816 that additional images may have been obtained for modifying the preferred image, then the process continues to step 1818. In step 1818, modifications may be made to the preferred image based on the additional images received at step 1816. Such modifications may include increasing resolution, producing a 3D image, displaying a different object or scene, and the like. The process then returns to step 1814 to display a preferred image, which may be displayed based on one or more preferences. The process then returns to step 1816, to determine whether additional images have been obtained and whether these images may be used to modify the preferred image. If it is determined at step 1816 that additional images may not have been obtained for modifying the preferred image, then the process ends at step 1820.

Figure 19:
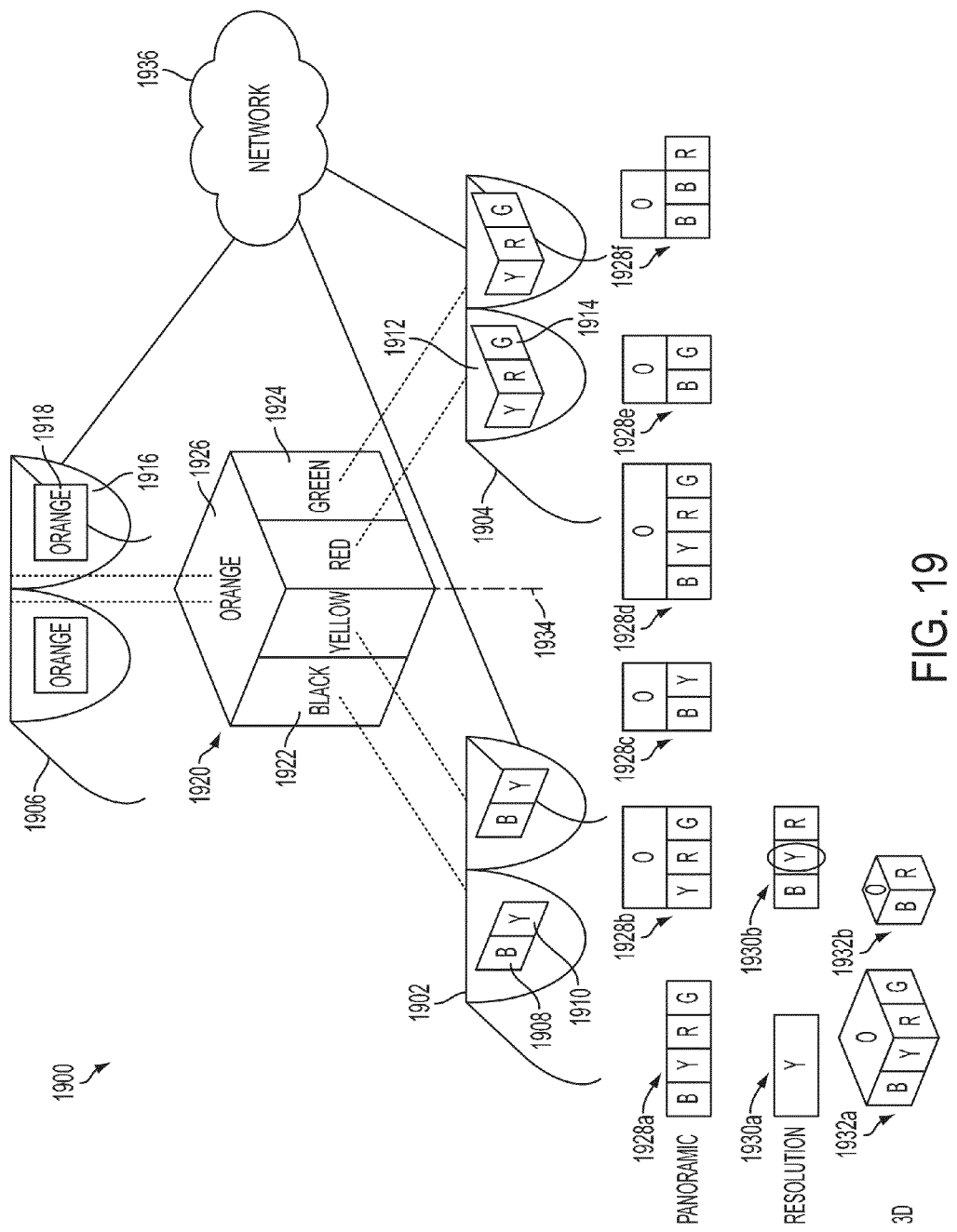
FIG. 19 illustrates an example head-mounted display system for generating one or more preferred images, in accordance with one or more disclosed features described herein.

FIG. 19 illustrates an example system 1900 in accordance with aspects of the present disclosure. The system 1900 may include one or more head-mounted displays 1902, 1904, and 1906, which may be, for example, similar to the head-mounted display 302 in FIG. 3 and may be worn by a user on, for example, a user's head like eyeglasses. The head-mounted displays 1902, 1904, and 1906 may be augmented reality devices and/or recording devices, which may be used to collect data about an object, such as by capturing an image of the object. The head-mounted displays 1902, 1904, and 1906 may be part of an ad hoc network, such as the network 1936. The head-mounted displays 1902, 1904, and 1906 may include the respective displays 1908, 1912, and 1916, which may display the respective images 1910, 1914, 1918 of an object, such as the block 1920. The block 1920 may be composed of one or more sides, such as the sides 1922, 1924, and 1926. The side 1922 may include black and yellow colors, the side 1924 may include red and green colors, and the side 1926 may include orange color. In some embodiments, the block 1920 may have preferences associated with it that instruct one or more head-mounted displays to modify images (e.g., with distortion, blurring, and/or avatar) associated with the block 1920. The image 1910 may be taken at a first angle with respect to an axis 1934 of object 1920, the image 1912 may be taken at a second angle with respect to an axis 1934 of object 1920, and the image 1912 may be taken at a third angle with respect to an axis 1934 of object 1920. The image 1910 may be of the side 1922 and may display the black and yellow colors. The image 1912 may be of the side 1924 and a portion of the side 1922, and may display the yellow, red, and green colors. The image 1912 may be of the side 1926 and may display the orange color. According to some embodiments, images 1910, 1914, and 1918 may be transmitted to an entity and/or device, such as an entity associated with the local office 103 and/or a head-mounted display, to determine a preferred image based on the images 1910, 1914, and 1918. The preferred image may be, for example, an image from among the images 1910, 1914, and 1918, a composite of one or more images 1910, 1914, and 1918, a panoramic based on one or more images 1910, 1914, and 1918, an image with an increased resolution based on one or more images 1910, 1914, and 1918, a 3D image based on one or more images 1910, 1914, and 1918, and the like. As stated above, the preferred image may also be displayed and/or created based on one or more preferences, such as preferences associated with a receiving device, a capturing device, a transmitting device, and the like. Some example of images that may be created based on the images 1910, 1914, and 1918 are shown in FIG. 19. For example, the image 1928*a*, which may be panoramic, may be based on the images 1910 and 1914, such that the images 1910 and 1914 may be merged together such that the yellow color may overlap using each of the images. The image 1928*b* may be based on the images 1914 and 1918, such that no overlap may be present. Alternatively, the image 1928*b* may be based on the images 1910, 1914, and 1918, with the yellow portion being from the image 1910 or being overlapped from the images 1910 and 1914. The image 1928*c* may be based on the images 1910 and 1918, with no overlap. Alternatively, the image 1928*c* may be based on the images 1910, 1914, and 1918, with the yellow portion being from the image 1912 or being overlapped from the images 1910 and 1914. The image 1928*d* may be based on the images 1910, 1914, and 1918, with no overlap or overlap between the images 1910 and 1914 for the yellow portion. The image 1928*e* may be based on the images 1910, 1914, and 1918, which may have portions of the images 1910, 1914, and 1918 removed, such as the yellow and red colors. The image 1928*f* may be based on the images 1910, 1914, and 1918, which may have replicated portions (e.g., the black color) from the image 1910. Alternatively, images additional to the images 1910, 1914, and 1918 may be used to supplement the preferred images. For example, a portion of the image 1928*f*, such as one of the black color areas, may have been based on one or more images additional to the images 1910, 1914, and 1918. In some embodiments, the preferred image may be modified or refined. For example, if the images 1910 and 1914 were used to create the image 1928*a*, a further modification of the image 1928*a* may be based on an additional the image 1918 to create 1928*d*. The image 1930*a*, which shows a yellow color, may be based on the images 1910 and 1914. The image 1930*a* may be an image with an increased resolution, such as a resolution higher than one or more of the images it may be based on. For example, the images 1910 and 1914 may be of a resolution of 2048×1080, and the image 1930*a* may be of a resolution of 4096×1080 (e.g., 4K resolution). The image 1930*a* may be created by, for example, merging or interpolating portions of the images 1910 and 1914. The image 1930*b*, which may be based on the images 1910 and 1914, may be an image including a portion having increased resolution. For example, the yellow portion of the image 1930*b* may have a higher resolution than the blue and/or red portions. The image 1932*a* may be based on the images 1910, 1914, and 1918, and may include the blue, yellow, red, green, and orange colors. The image 1932*a* may be constructed as a 3D image, which may use a location associated with the images 1910, 1914, and 1918 in creating the 3D image. For example, the locations may indicate depth, length, width, where colors may go, and the like, which may be used in creating the image 1932*a*. In some embodiments, the yellow portion of the image 1932*a* may have a higher resolution than other portions of the image 1932*a*. The image 1932*b* may be based on the images 1910, 1914, and 1918, and may include the blue, red, and orange colors. The image 1932*b* may be constructed as a 3D image, which may use portions of the images 1910, 1914, and 1918.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    obtaining, by a computing device, an image comprising an object;
    performing pattern recognition on the image to determine a characteristic associated with the object;
    searching a central repository based on the characteristic to determine a candidate match associated with the object, the candidate match being associated with a preference, the preference comprising display instructions for the image that are based at least on a permission associated with the computing device and on a geographic location of the computing device; and
    modifying the image based on the display instructions for the image.

2. The method of claim 1, wherein:
    the obtaining the image comprising the object comprises obtaining an image comprising a face;
    the performing the pattern recognition comprises performing facial recognition on the image to determine a facial characteristic of the face;
    the searching the central repository comprises searching a facial recognition database based on the facial characteristic to determine a candidate facial match associated with the face, the candidate facial match being associated with the preference; and
    the modifying the image comprises modifying the image based on the preference associated with the candidate facial match.

3. The method of claim 2, wherein the modifying the image comprises modifying a display of the face in the image.

4. The method of claim 1, wherein the obtaining the image comprises obtaining the image via an imaging device, the method further comprising:
    determining whether a list of one or more approved devices comprises the imaging device, the list of one or more approved devices comprising devices located in a predetermined geographic location; and
    modifying the image based on whether the list of one or more approved devices comprises the imaging device.

5. The method of claim 1, further comprising collecting statistical data based on a display of the modified image.

6. The method of claim 1, wherein the modifying the image comprises augmenting a display of the object with at least one of a logo, a product, an advertisement, and combinations thereof.

7. The method of claim 1, wherein the modifying the image comprises performing at least one of: distorting at least a portion of the image corresponding to the object, augmenting a display of the object based on a location associated with the object, or modifying a display of at least a portion of the object with an avatar associated with the object.

8. The method of claim 1, wherein:
    the performing the pattern recognition further comprises determining at least one characteristic of a logo displayed in the image;
    the searching the central repository further comprises searching the central repository based on the at least one characteristic of the logo to determine at least one candidate logo associated with the logo displayed in the image, the at least one candidate logo being associated with the preference, the preference comprising display instructions for the logo; and
    the modifying the image further comprises modifying the image based on the display instructions for the logo.

9. The method of claim 8, wherein the modifying the image based on the display instructions for the logo further comprises performing at least one of: distorting the logo, modifying the logo to substantially resemble the at least one candidate logo, adding at least one object associated with the at least one candidate logo, or overlaying the logo with at least one object.

10. The method of claim 8, wherein the modifying the image based on the display instructions for the logo further comprises modifying a display of the object with the at least one candidate logo.

11. A method comprising:
    obtaining, by a computing device, an image comprising at least one logo;
    performing pattern recognition on the image to determine at least one characteristic associated with the at least one logo;
    searching a database based on the at least one characteristic to determine at least one entry associated with the at least one logo, the at least one entry being associated with at least one preference, the at least one preference comprising display instructions for the image; and
    modifying the image based on the display instructions for the image by performing at least one of: distorting a display of the at least one logo, modifying a display of the at least one logo to substantially resemble the at least one logo, adding at least one object associated with the at least one logo, or overlaying the at least one logo with at least one object.

12. The method of claim 11,
    wherein the display instructions are based on at least one of a permission associated with the computing device or a geographic location of the computing device.

13. The method of claim 11, wherein the at least one logo comprises a trademark or a product identifier.

14. The method of claim 11, further comprising:
    determining that the image comprises a different object, wherein the at least one preference comprises display instructions specific to the different object; and
    modifying the different object based on the display instructions specific to the different object.

15. A method comprising:
    obtaining, by a computing device, an image comprising an object;

determining that a transmitter is associated with the object;

determining a first preference associated with the object based on the transmitter;

retrieving a second preference associated with the object from a database, wherein the second preference is different from the first preference and at least one of the first preference or the second preference is based on a geographic location of the object;

determining whether the first preference conflicts with the second preference; and modifying the image based on one of the first preference or the second preference.

16. The method of claim 15, further comprising:

in response to determining that the first preference conflicts with the second preference, determining which of the first preference and the second preference has a higher priority;

if it is determined that the first preference has the higher priority, modifying the image based on the first preference; and if it is determined that the second preference has the higher priority, modifying the image based on the second preference.

17. The method of claim 15, further comprising:

determining that the image comprises a different object;

determining a third preference that is specific to the different object; and modifying the different object in the image based on the third preference.

18. The method of claim 15, further comprising:

performing pattern recognition on the image to determine a characteristic of the object, wherein the retrieving the second preference from the database comprises searching the database based on the characteristic to determine a candidate match associated with the object, wherein the candidate match is associated with the second preference.

19. The method of claim 15, further comprising:

modifying the image based on a permission associated with the computing device.

* * * * *